US009189825B2

(12) United States Patent
Im et al.

(10) Patent No.: US 9,189,825 B2
(45) Date of Patent: Nov. 17, 2015

(54) ELECTRONIC DEVICE AND METHOD FOR DISPLAYING STEREOSCOPIC IMAGE

(75) Inventors: Soungmin Im, Seoul (KR); Taehyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 971 days.

(21) Appl. No.: 13/085,142

(22) Filed: Apr. 12, 2011

(65) Prior Publication Data

US 2012/0262446 A1 Oct. 18, 2012

(51) Int. Cl.
*G06T 15/00* (2011.01)
*G06T 1/00* (2006.01)
*G06F 3/01* (2006.01)
*G06F 3/0481* (2013.01)
*H04N 13/00* (2006.01)

(52) U.S. Cl.
CPC .............. *G06T 1/0007* (2013.01); *G06F 3/017* (2013.01); *G06F 3/04815* (2013.01); *H04N 13/0007* (2013.01); *H04N 13/0018* (2013.01); *H04N 13/0022* (2013.01); *G06F 2203/04806* (2013.01)

(58) Field of Classification Search
CPC .......... G06F 2203/04806; G06F 3/017; G06F 3/04815; G06T 1/0007; H04N 13/0007; H04N 13/0018; H04N 13/0022
USPC .......................................................... 348/46
See application file for complete search history.

(56) References Cited

U.S. PATENT DOCUMENTS

| 8,334,867 | B1 * | 12/2012 | Davidson ....................... 345/419 |
| 2004/0233222 | A1 * | 11/2004 | Lee et al. ....................... 345/621 |
| 2009/0046140 | A1 * | 2/2009 | Lashmet et al. ................ 348/51 |
| 2009/0228841 | A1 | 9/2009 | Hildreth |
| 2010/0060576 | A1 | 3/2010 | Underkoffler et al. |
| 2010/0171697 | A1 | 7/2010 | Son et al. |
| 2010/0303289 | A1 * | 12/2010 | Polzin et al. ................... 382/103 |
| 2011/0012896 | A1 | 1/2011 | Ji |
| 2011/0025601 | A1 * | 2/2011 | Wilson et al. ................... 345/156 |
| 2011/0057875 | A1 * | 3/2011 | Shigeta et al. .................. 345/156 |
| 2012/0013529 | A1 * | 1/2012 | McGibney et al. ............ 345/156 |

OTHER PUBLICATIONS

Ztouch:An Infrastructure for 3D gesture interaction in the proximity of tabletop surfaces ITS'10, Nov. 7-10, 2010, Saarbrucken, Germany.*
"Interactions in the air: adding further depth to interactive tabletops" UIST'09, Oct. 4-7, 2009.*

* cited by examiner

*Primary Examiner* — Mohammed Rahaman
(74) *Attorney, Agent, or Firm* — Birch, Stewart, Kolasch & Birch, LLP

(57) ABSTRACT

An electronic device is disclosed. The electronic device can comprise a display and a controller. The display can display stereoscopic images. The controller can scale the stereoscopic image while moving the stereoscopic image along a virtual axis. At this time, the controller can change the scale factor of the scaled stereoscopic image in proportion to the depth in the direction of the virtual axis.

26 Claims, 51 Drawing Sheets

ELECTRONIC DEVICE AND METHOD FOR DISPLAYING STEREOSCOPIC IMAGE

BACKGROUND

1. Field

This document relates to an electronic device and a method thereof for displaying stereoscopic images. More specifically, this document relates to an electronic device and a method thereof for displaying stereoscopic images capable of scaling stereoscopic images in response to a gesture of the user.

2. Related Art

As terminals such as personal computers, notebooks, and mobile phones are getting equipped with diversified functions, they are evolving into multimedia players with multi-functions of capturing images or videos, playing audio or video files, providing games, receiving broadcast programs, and so on.

A terminal can be classified into a mobile or a stationary terminal depending on mobility of the terminal. A display device can be classified into a handheld or a vehicle mounted terminal depending on whether the user can carry the display device or not. To support and extend the functions of a terminal, improving structural and/or software part of the terminal can be taken into account.

Recently, various electronic devices are being released to the market, the devices being capable of displaying three dimensional stereoscopic images or equipped with a gesture user interface accepting control inputs indicated by the user's gesture. At the same time, those devices are getting great attention from the public. Not only stationary devices such as televisions and personal computers but also mobile devices including handheld phones, smart phones, and navigation terminals are showing the same trend as described above.

SUMMARY

An aspect of this document is to provide an electronic device and a method thereof for displaying stereoscopic images capable of displaying stereoscopic images and scaling up or down the images based on the user's gesture.

In an aspect, an electronic device according to an embodiment of the present invention can comprise a camera, a display, and a controller. The camera can obtain a user's image. The display can display stereoscopic images. The controller can scale up or down the stereoscopic images while moving the stereoscopic images along a virtual axis according to the gesture recognized from the user's image. At this time, the controller can change the scale factor for the stereoscopic images to be scaled up or down in proportion to the depth along the virtual axis.

In another aspect, an electronic device according to another embodiment of the present invention can comprise a camera, a display, and a controller. The camera can obtain a user's image. The display can display stereoscopic images. The controller can recognize the user's gesture from the user's image and based on the recognized gesture, set up a virtual axis and scale the stereoscopic images. At this time, the controller, based on the recognized gesture, can change the scale factor for the stereoscopic images to be scaled up or down in proportion to the depth along the virtual axis.

In yet another aspect, a method of an electronic device for displaying stereoscopic images comprises displaying stereoscopic images; obtaining a user's image; recognizing the user's gesture from the user's image; and scaling stereoscopic images while moving the stereoscopic images along a virtual axis. At this point, the scaling stereoscopic images can comprise changing a scale factor of the stereoscopic images to be scaled in proportion to the depth along the virtual axis.

In still another aspect, a method of an electronic device for displaying stereoscopic images comprises displaying stereoscopic images; obtaining a user's image; recognizing the user's gesture from the user's image; and setting up a virtual axis based on the recognized gesture and scaling the stereoscopic images. At this point, the scaling stereoscopic images can comprise changing a scale factor of the stereoscopic images to be scaled in proportion to the depth along the virtual axis based on the recognized gesture.

According to an electronic device and a method thereof for displaying stereoscopic images according to an embodiment of the present invention, the user can scale up or down stereoscopic images displayed through gesture.

In addition, according to an electronic device and a method thereof for displaying stereoscopic images according to an embodiment of the present invention, the user can scale up or down stereoscopic images while moving the stereoscopic images displayed along an established virtual axis through gesture.

Moreover, according to an electronic device and a method thereof for displaying stereoscopic images according to an embodiment of the present invention, the user can change a scale factor of stereoscopic images in proportion to the depth along a virtual axis.

BRIEF DESCRIPTION OF THE DRAWINGS

The implementation of this document will be described in detail with reference to the following drawings in which like numerals refer to like elements.

DETAILED DESCRIPTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, an electronic device relating to this document will be described below in more detail with reference to the accompanying drawings. In the following description, suffixes "module" and "unit" are given to components of the mobile terminal in consideration of only facilitation of description and do not have meanings or functions discriminated from each other.

The electronic device described in the specification may be mobile terminal such as a cellular phone, a smart phone, a laptop computer, a digital broadcasting terminal, personal digital assistants (PDA), a portable multimedia player (PMP), a navigation system and so on. Also, the electronic device may be stationary device such as a television, a personal computer, and so on.

Figure 1:
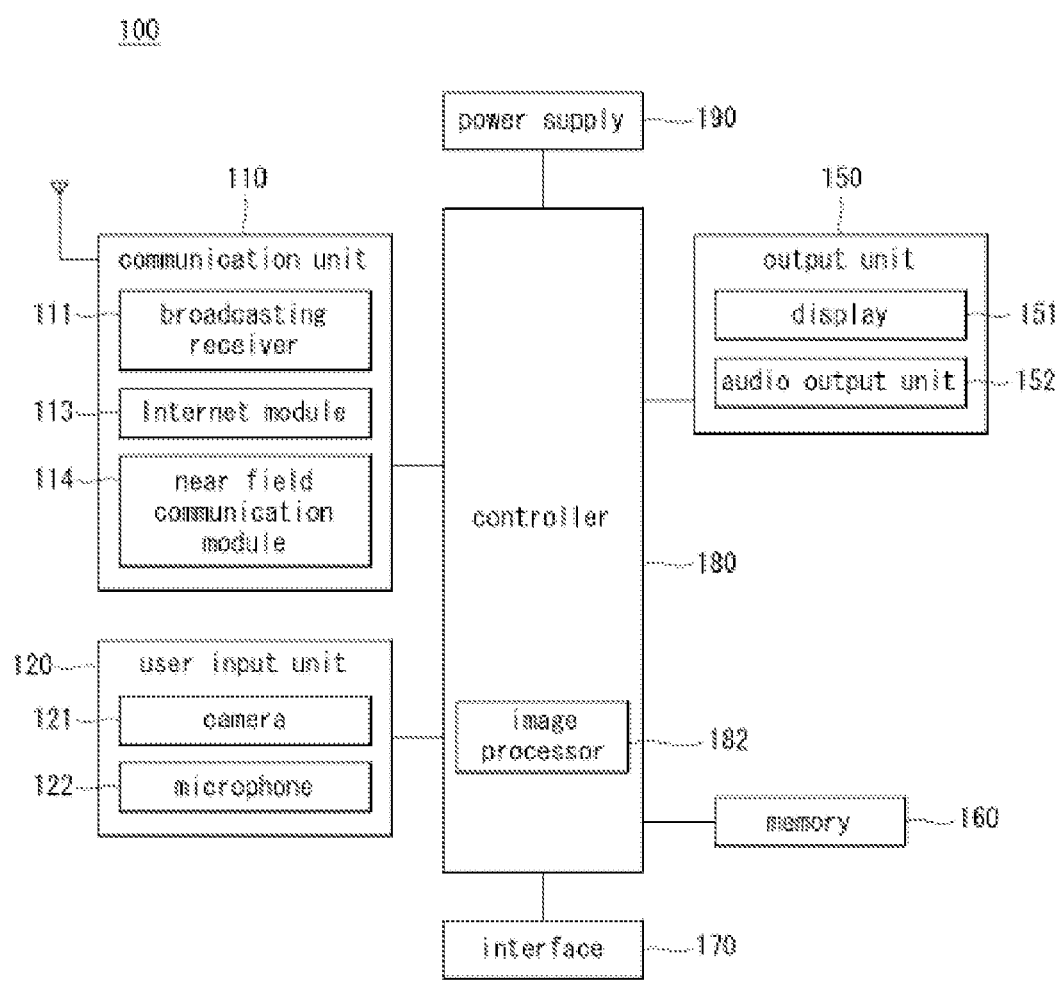
FIG. 1 is a block diagram of an electronic device according to an embodiment of the present invention.

FIG. 1 is a block diagram of a display device relating to an embodiment of this document.

As shown, the display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The near field communication module 114 may correspond to a module for near field communication. Further, Bluetooth®, radio frequency identification (RFID), infrared data association (IrDA), ultra wideband (UWB) and/or ZigBee® may be used as a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the display device 100. The display 151 may display a user interface (UI) or a graphic user interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the radio communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the mobile terminal 100. The interface 170 may receive data from the external devices or power and transmit the data or power to internal components of the display device terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the mobile terminal 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in this document can be implemented in software, hardware or a computer readable recording medium. According to hardware implementation, embodiments of this document may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
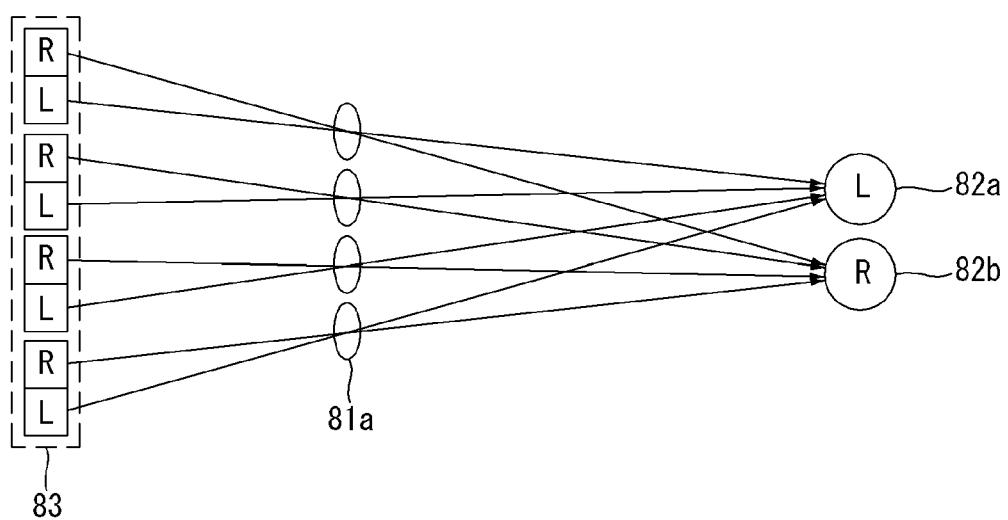
FIGS. 2 and 3 illustrate a method of displaying three dimensional stereoscopic images employing binocular parallax related to the present invention.
Figure 3:
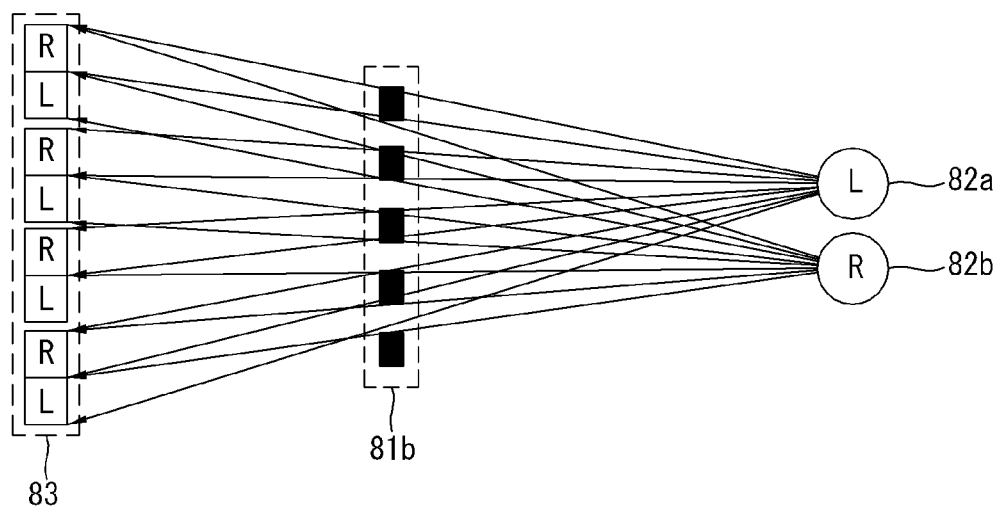

FIGS. 2 and 3 are views illustrating a method for displaying a stereoscopic image using binocular parallax according to an exemplary embodiment of the present invention. Specifically, FIG. 2 shows a scheme using a lenticular lens array, and FIG. 3 shows a scheme using a parallax barrier.

Binocular parallax (or stereo disparity) refers to the difference in vision of viewing an object between a human being's (user's or observer's) left and right eyes. When the user's brain combines an image viewed by the left eye and that viewed by the right eye, the combined image makes the user feel stereoscopic. Hereinafter, the phenomenon in which the user feels stereoscopic according to binocular parallax will be referred to as a 'stereoscopic vision', and an image causing a stereoscopic vision will be referred to as a 'stereoscopic image'. Also, when a particular object included in an image causes the stereoscopic vision, the corresponding object will be referred to as a 'stereoscopic object'.

A method for displaying a stereoscopic image according to binocular parallax is classified into a glass type method and a glassless type method. The glass type method may include a scheme using tinted glasses having a wavelength selectivity, a polarization glass scheme using a light blocking effect according to a deviation difference, and a time-division glass scheme alternately providing left and right images within a residual image time of eyes. Besides, the glass type method may further include a scheme in which filters each having a different transmittance are mounted on left and right eyes and a cubic effect with respect to a horizontal movement is obtained according to a time difference of a visual system made from the difference in transmittance.

The glassless type method, in which a cubic effect is generated from an image display surface, rather than from an observer, includes a parallax barrier scheme, a lenticular lens scheme, a microlens array scheme, and the like.

With reference to FIG. 2, in order to display a stereoscopic image, a display module 151 includes a lenticular lens array 81*a*. The lenticular lens array 81*a* is positioned between a display surface 81 on which pixels (L) to be input to a left eye 82*a* and pixels (R) to be input to a right eye 82*b* are alternately arranged along a horizontal direction, and the left and right eyes 82*a* and 82*b*, and provides an optical discrimination directionality with respect to the pixels (L) to be input to the left eye 82*a* and the pixels (R) to be input to the right eye 82*b*. Accordingly, an image which passes through the lenticular lens array 81*a* is separated by the left eye 82*a* and the right eye 82*b* and thusly observed, and the user's brain combines (or synthesizes) the image viewed by the left eye 82*a* and the image viewed by the right eye 82*b*, thus allowing the user to observe a stereoscopic image.

With reference to FIG. 3, in order to display a stereoscopic image, the display module 151 includes a parallax barrier 81*b* in the shape of a vertical lattice. The parallax barrier 81*b* is positioned between a display surface 81 on which pixels (L) to be input to a left eye 82*a* and pixels (R) to be input to a right eye 82*b* are alternately arranged along a horizontal direction, and the left and right eyes 82*a* and 82*b*, and allows images are separately observed at the left eye 82*a* and the right eye 82*b*. Accordingly, the user's brain combines (or synthesizes) the image viewed by the left eye 82*a* and the image viewed by the right eye 82*b*, thus allowing the user to observe a stereoscopic image. The parallax barrier 81*b* is turned on to separate incident vision only in the case of displaying a stereoscopic image, and when a planar image is intended to be displayed, the parallax barrier 81*b* may be turned off to allow the incident vision to pass through without being separated.

Meanwhile, the foregoing methods for displaying a stereoscopic image are merely for explaining exemplary embodiments of the present invention, and the present invention is not meant to be limited thereto. Beside the foregoing methods, a stereoscopic image using binocular parallax may be displayed by using various other methods.

Figure 4:
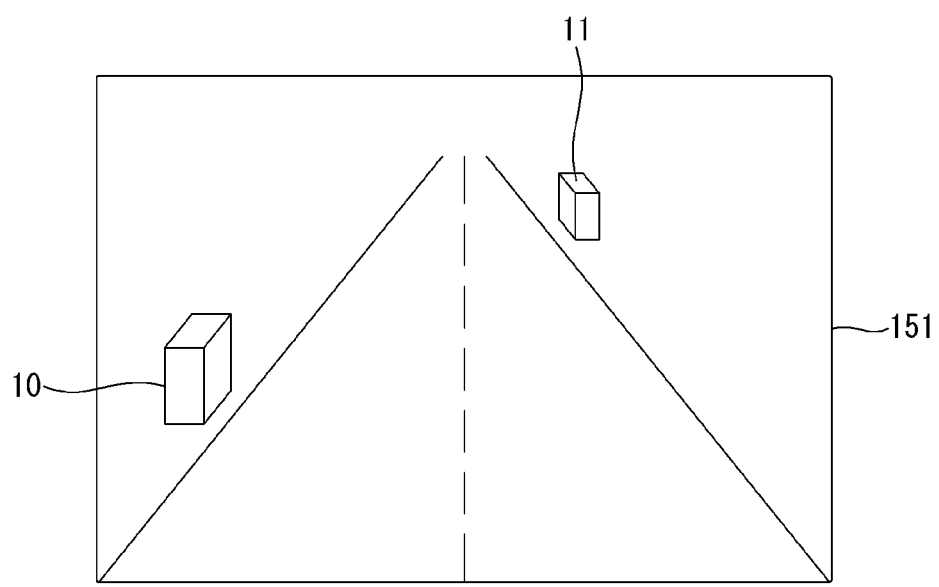
FIGS. 4 to 6 illustrate a method for displaying stereoscopic images of an electronic device according to an embodiment of the present invention.
Figure 5:
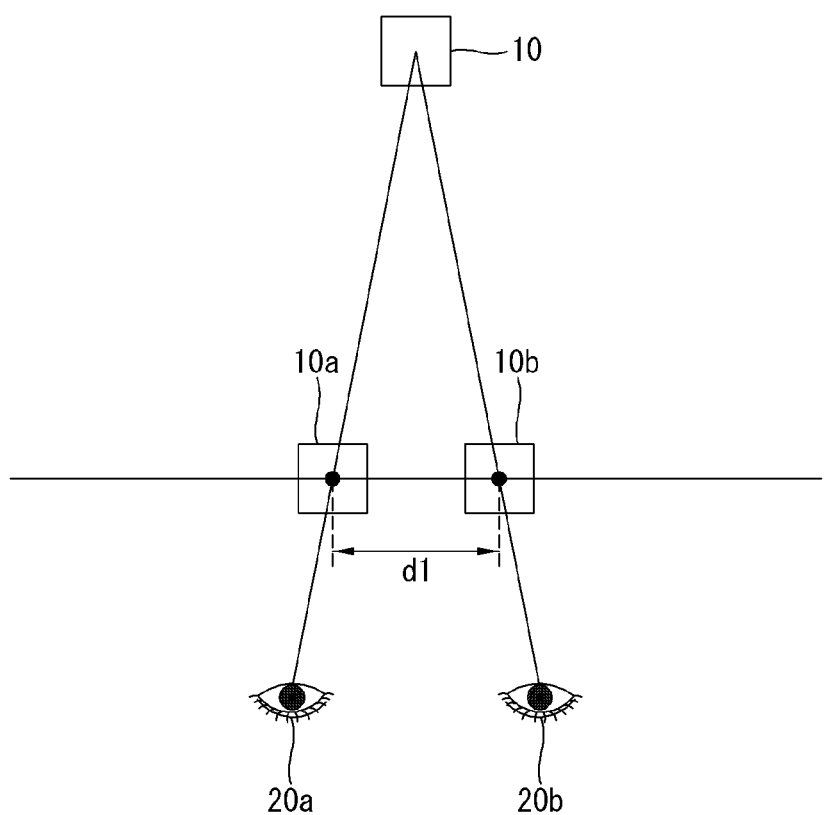
Figure 6:
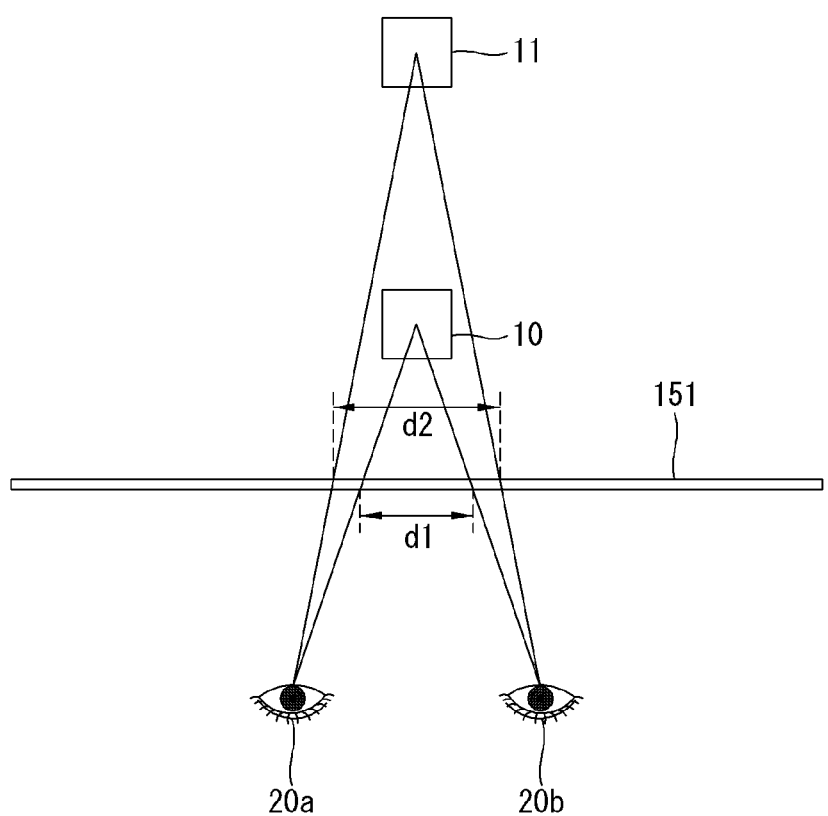

FIGS. 4 to 6 illustrate a method for displaying stereoscopic images of an electronic device according to an embodiment of the present invention.

FIG. 4 illustrates an example where displayed is a stereoscopic image containing multiple image objects 10, 11.

For example, the stereoscopic image illustrated in FIG. 4 can be the image obtained through the camera 121. The stereoscopic image includes a first image object 10 and a second image object 11. At this time, for the convenience of description, it is assumed that two image objects 10, 11 are included in the stereoscopic image; however, in practice, much more image objects can be included in the stereoscopic image.

The controller 180 can display images obtained in real-time through the camera 121 on the display 151 in the form of a camera preview.

The controller 180 can obtain at least one stereo disparity corresponding to the at least one image object.

When the camera 121 is a 3D camera capable of obtaining left and right images, the controller 180 can obtain the respective stereo disparities of the first 10 and the second image object 11 through the left and the right image obtained through the camera 121.

FIG. 5 illustrates stereo disparity of an image object included in a stereoscopic image.

For example, with reference to FIG. 5, the first image object 10 forms a left image 10*a* viewed by a left eye 20*a* of the user and a right image 10*b* viewed by a right eye 20*b* of the user.

The controller 180 can obtain stereo disparity d1 corresponding to the first image object 10 through the left 10*a* and the right image 10*b*.

On the other hand, when the camera 121 is a 2D camera, the controller 180, by using a predetermined algorithm transforming a 2D image into a 3D image, transforms 2D images obtained through the camera 121 into the corresponding stereoscopic images, thereby displaying the stereoscopic images on the display 151.

Also, the controller 180, by using left and right images generated by employing the image transformation algorithm, can obtain the respective stereo disparities of the first image object 10 and the second image object 11.

FIG. 6 is a drawing for comparing stereo disparities of image objects 10, 11 shown in FIG. 4 with each other.

With reference to FIG. 6, the stereo disparity d1 of the first image object 10 and the stereo disparity d2 of the second image object 11 are different from each other. As shown in FIG. 6, since d2 is larger than d1, the second image object 11 is viewed more distant from the user than the first image object 10.

Figure 7:
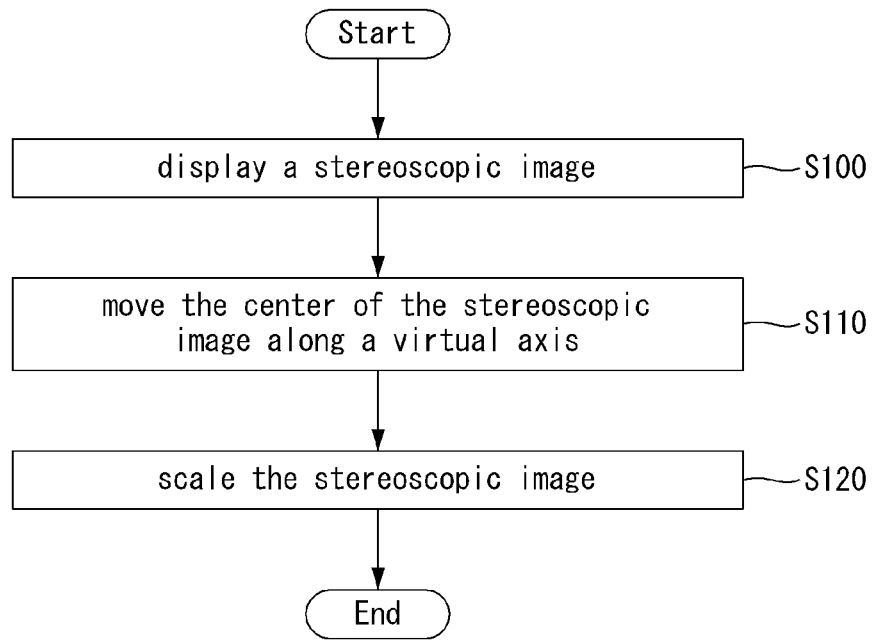
FIG. 7 is a flow diagram illustrating a method for displaying stereoscopic images of an electronic device according to an embodiment of the present invention.

FIG. 7 is a flow diagram illustrating a method for displaying stereoscopic images of an electronic device 100 according to an embodiment of the present invention. In what follows, the procedure of displaying stereoscopic images will be described with reference to related drawings.

First, the controller 180 of the electronic device 100 displays a stereoscopic image on the display 100. At this point, the stereoscopic image denotes a three-dimensional stereoscopic image utilizing stereo disparity. When a stereoscopic image is displayed, the controller 180 scales up or down the stereoscopic image S120 while moving the center of the stereoscopic image along a virtual axis S110. In other words, the controller 180 can magnify or reduce the size of the stereoscopic image while changing the depth at which the stereoscopic image is displayed.

Figure 8:
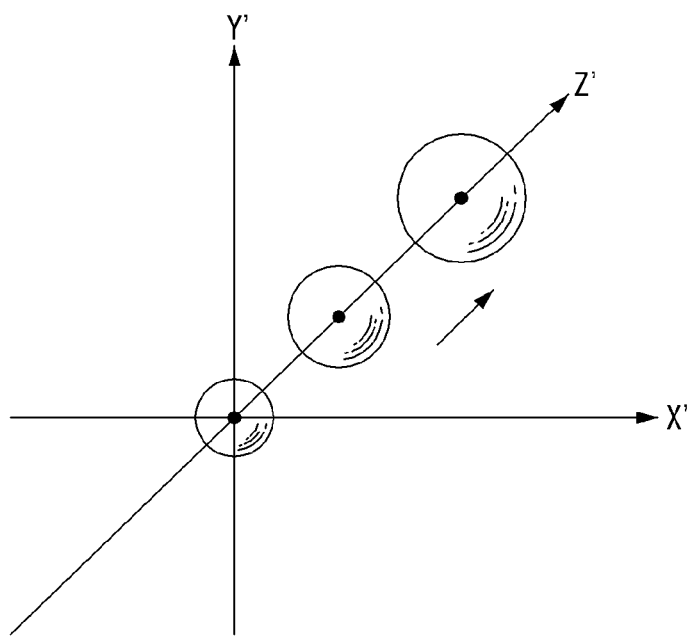
FIGS. 8 and 9 illustrate a procedure of scaling up the stereoscopic images displayed on a display according to a method for displaying stereoscopic images of an electronic device shown in FIG. 7.
Figure 9:
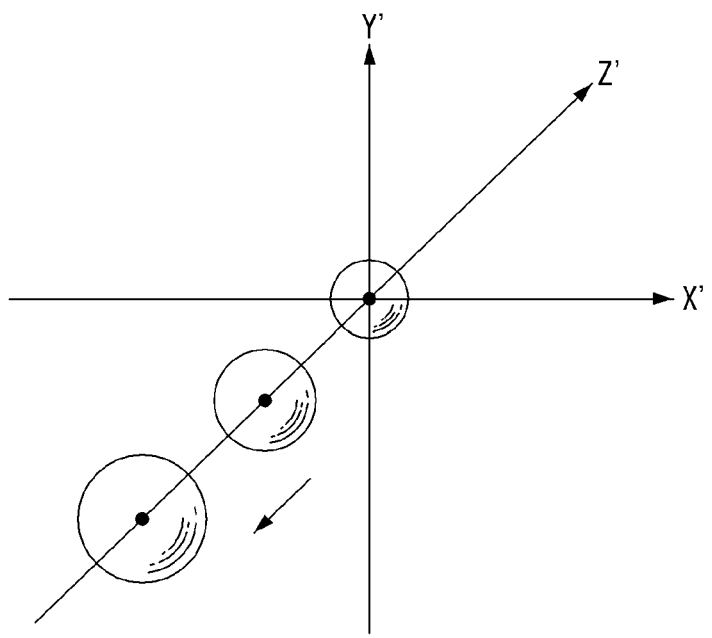

FIGS. 8 and 9 illustrate a procedure of scaling up the stereoscopic images displayed on a display according to a method for displaying stereoscopic images of an electronic device 100 shown in FIG. 7. With reference to FIGS. 8 and 9, it can be known that the controller 180 of the electronic device 100 can magnify a sphere, which is a stereoscopic image, while moving the center of the sphere along Z' axis.

It should be noted that X, Y, and Z axis in this document correspond to reference axes of the three-dimensional Cartesian coordinate system of the actual living space. On the other hand, X', Y', and Z' axis correspond to reference axes of a virtual three-dimensional Cartesian coordinate system in the virtual space where stereoscopic images are displayed on the display 151 of the electronic device; the respective axes correspond to X, Y, and Z axis of the actual three-dimensional Cartesian coordinate system.

According to the procedure of magnifying a stereoscopic image shown in FIG. 8, the size of the sphere is increased, while the depth of the sphere is deepened. The user then feels that though the sphere is gradually more distant, the size thereof is being increased. On the other hand, according to the procedure of magnifying a stereoscopic image shown in FIG. 9, the user can know that the depth of the sphere becomes small as the size of the sphere is being increased. The user then recognizes that the size of the sphere is growing as the sphere approaches forward.

Figure 10:
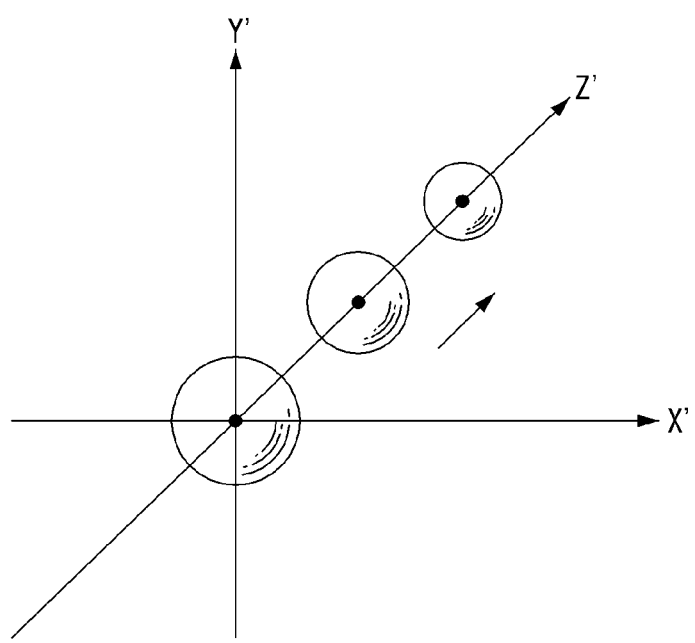
FIGS. 10 and 11 illustrate a procedure of scaling down the stereoscopic images displayed on a display according to a method for displaying stereoscopic images of an electronic device shown in FIG. 7.
Figure 11:
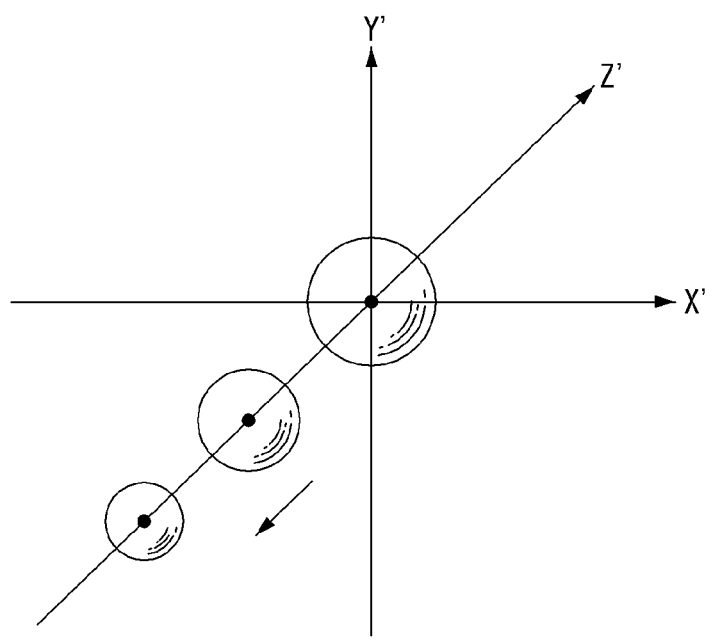
Figure 12:
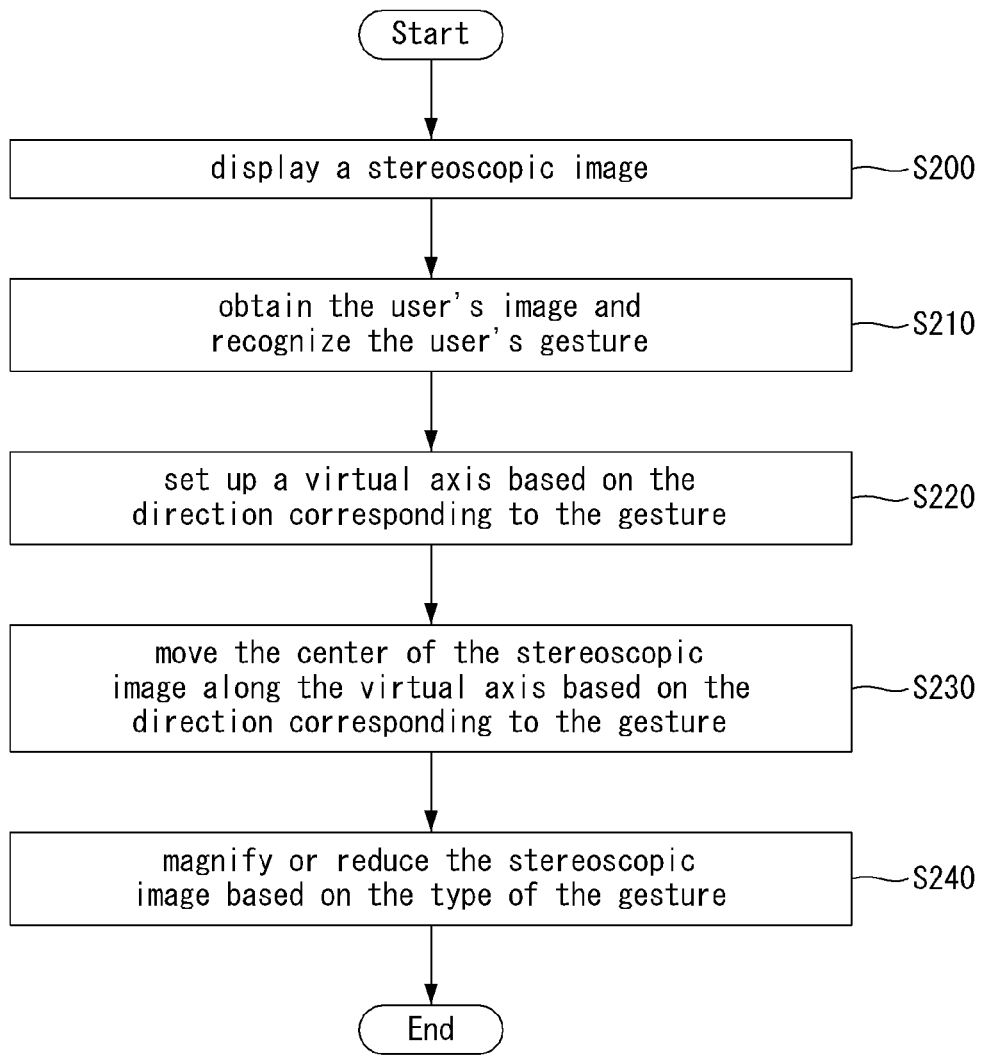
FIG. 12 is a flow diagram illustrating a method for displaying stereoscopic images of an electronic device according to another embodiment of the present invention.

FIGS. 10 and 11 illustrate a procedure of scaling down the stereoscopic images displayed on a display 151 according to a method for displaying stereoscopic images of an electronic device 100 shown in FIG. 7. With reference to FIGS. 11 and 12, it can be known that the controller of the electronic device can reduce the stereoscopic image of a sphere while moving the center of the stereoscopic image along Z' axis.

According to a procedure of magnifying a stereoscopic image shown in FIG. 11, the size of the sphere is reduced while the depth of the sphere deepens. The user then recognizes that the size of the sphere is reduced as the sphere become more distant. On the other hand, according to a procedure of magnifying a stereoscopic image shown in FIG. 12, it can be known that the size of the sphere is gradually reduced while the depth of the sphere deepens. The user then recognizes that the size of the sphere is reduced while the sphere approaches toward the user.

FIG. 12 is a flow diagram illustrating a method for displaying stereoscopic images of an electronic device 100 according to another embodiment of the present invention. In what follows, a method for displaying stereoscopic images of the electronic device will be described with reference to related drawings.

The controller 180 of the electronic device 100 displays stereoscopic images S200. If a stereoscopic image is displayed, the controller 180 obtains an image of the user of the electronic device through a camera 121 and recognizes the user's gesture by analyzing the image of the user S210. Once the user's gesture is recognized, the controller 180 sets up a virtual axis based on the direction corresponding to the recognized gesture S220.

Figure 13:
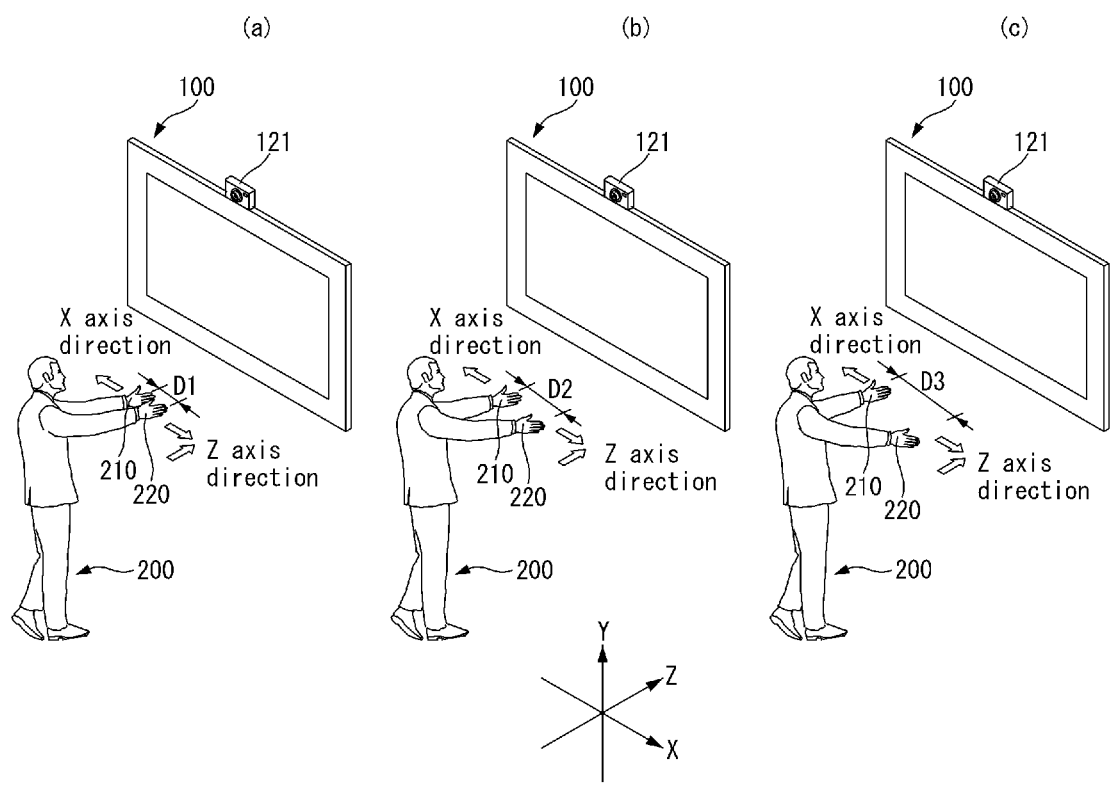
FIGS. 13 and 14 illustrate a procedure of the electronic device's recognizing the user's gesture and setting up a virtual axis along the direction corresponding to the recognized gesture according to the S210 to S220 steps of FIG. 12.
Figure 14:
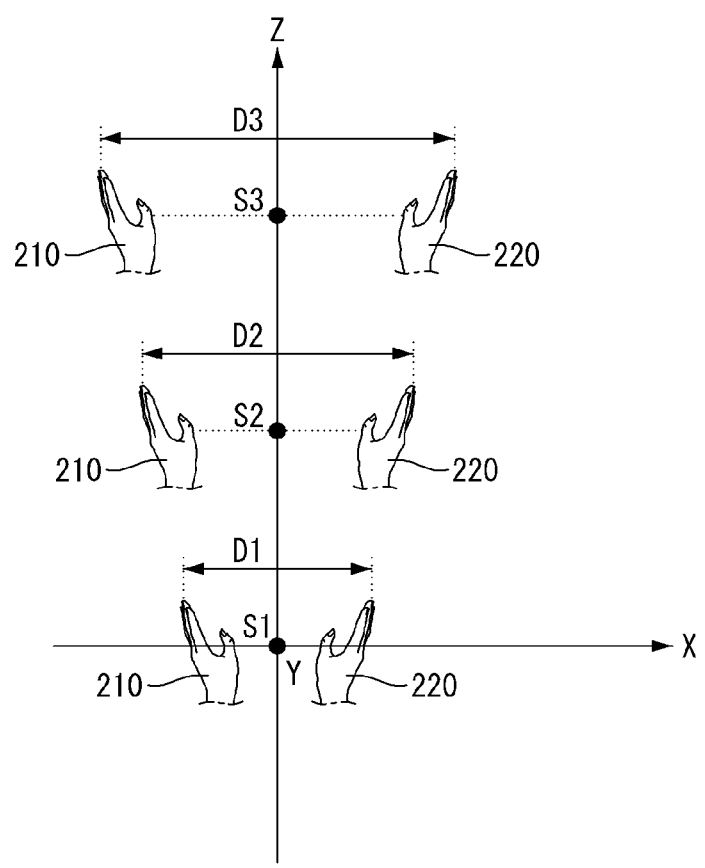

FIGS. 13 and 14 illustrate a procedure of the electronic device's 100 recognizing the user's 200 gesture and setting up a virtual axis along the direction corresponding to the recognized gesture according to the S210 to S220 steps of FIG. 12. With reference to FIG. 13, it can be known that the electronic device 100 is a TV capable of recognizing the user's gesture and scaling stereoscopic images displayed on a display 151 according to the recognized gesture.

FIG. 13 assumes that both hands 210, 220 of the user are endowed with control and the user interface for gesture of both hands 210, 220 has been activated. It is further assumed that a specific point between both hands 210, 220 of the user acts as a reference for determining the direction corresponding to the gesture.

In the configuration of FIG. 13(a), the distance between both hands 210, 220 of the user is D1; the user moves his or her hands in the positive direction of Z axis and separates both hands from each other in the direction of X axis. Now, the configuration of FIG. 13(b) is obtained and the distance between the two hands 210, 220 of the user becomes D2. In the configuration of FIG. 13(b), the distance between the two hands 210, 220 of the user is D2; the user moves his or her hands in the positive direction of Z axis and separates the two hands 210, 220 from each other in the direction of X axis.

Then, the configuration of FIG. 13(c) is obtained and the distance between the two hands 210, 220 of the user becomes D3. In other words, according to the illustration of FIG. 13, the user's gesture can be interpreted in such a way that the positive direction of Z axis is recognized as the direction corresponding to the user's gesture and types of the user's gesture can be identified by the distance made by separating the user's hands 210, 220 from each other. Once the direction and the type of the user's gesture are identified, the controller 180 can set up Z axis as a virtual axis corresponding to the gesture.

With reference to FIG. 14, it is assumed that a center point S1, S2, S3 between both hands 210, 220 of the user acts as a criterion to determine the direction of the gesture; however, the scope of the present invention is not limited to the above. For example, a criterion to determine the direction corresponding to the gesture can be an arbitrary point between the two hands of the user.

In FIGS. 13 and 14, since the user moves his or her hands in the positive direction of Z axis, the controller 180 sets up Z' axis corresponding to Z axis as a virtual axis that corresponds to the user's gesture. However, if the user moves his or her hands along an arbitrary direction in the three-dimensional space, the controller 180 can set up a virtual axis corresponding to the arbitrary direction and scale up or down the stereoscopic image while moving the stereoscopic image along a virtual axis corresponding to the arbitrary direction.

Once the virtual axis is established, the controller moves the stereoscopic image along the virtual axis based on the direction corresponding to the gesture S230 and scales up or down the stereoscopic image based on the type of the gesture S240. At this time, the center of the stereoscopic image and the center of the scaled up or down stereoscopic image can be positioned on the virtual axis. Also, if the type of the gesture indicates magnifying the stereoscopic image, the controller 180 scales up the stereoscopic image; if reducing the stereoscopic image, the controller 180 scales down the stereoscopic image.

In the following, examples of the controller's magnifying the stereoscopic image will be described under the assumption that the gesture illustrated in FIGS. 13 and 14, namely, the gesture moving both hands 210, 220 along Z-axis and separating the two hands 210, 220 from each other indicates magnifying the stereoscopic image.

FIGS. 15 to 20 are examples of an electronic device 100 according to an embodiment of the present invention magnifying stereoscopic images in response to the user's gesture shown in FIGS. 13 and 14. It should be noted that the coordinate system of FIGS. 15 to 20 in which stereoscopic images are displayed is a virtual coordinate system attached to the display 151 where the stereoscopic image is displayed; and the center of the stereoscopic image corresponds to the center point between both hands of the user.

Figure 15:
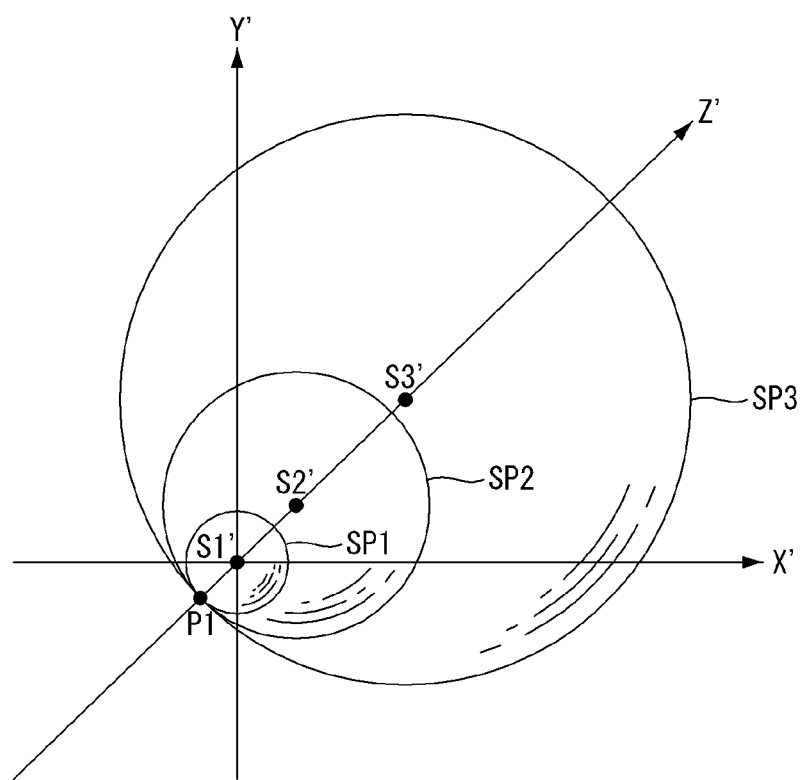
FIGS. 15 to 20 illustrate examples of an electronic device according to an embodiment of the present invention scaling up stereoscopic images in response to the user's gesture shown in FIGS. 13 and 14.

With reference to FIG. 15, if the user makes a gesture illustrated in FIG. 13 after a sphere SP1 is displayed in the display 151, the controller 180 of the electronic device 100 magnifies the sphere by moving the center of the sphere along the positive direction of Z' axis which corresponds to the gesture.

In the configuration of FIG. 14(*a*), the center S1 of the two hands corresponds to the center S1' of the sphere SP1 shown in FIG. 15, while the center S2 of the two hands in the configuration of FIG. 14(*b*) corresponds to the center S2' of the magnified sphere SP2 shown in FIG. 15 and the center S3 of the two hands in the configuration of FIG. 14(*c*) the center S3' of the magnified sphere SP3 shown in FIG. 15.

Figure 16:
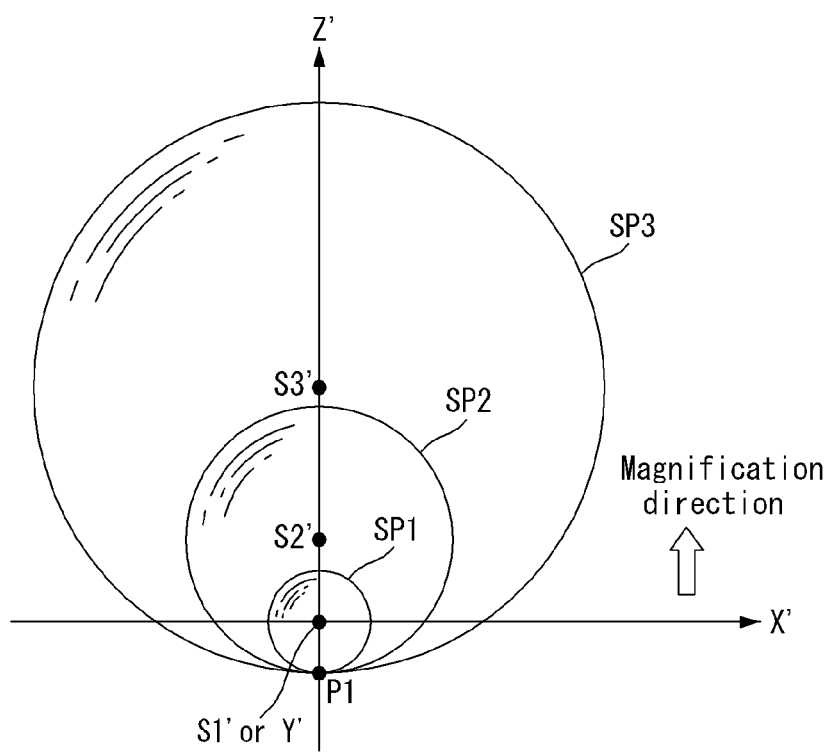

FIG. 16 shows spheres of FIG. 15 viewed from the top of virtual space. With reference to FIGS. 15 and 16, the sphere SP1 is inscribed in each of the magnified spheres SP2, SP3 through a single point P1. In other words, since the controller 180 magnifies the sphere in the positive direction of Z' axis only, the minimum depth along Z' axis that the user feels in association to the magnified sphere is kept to be constant, namely the P1 point.

Figure 17:
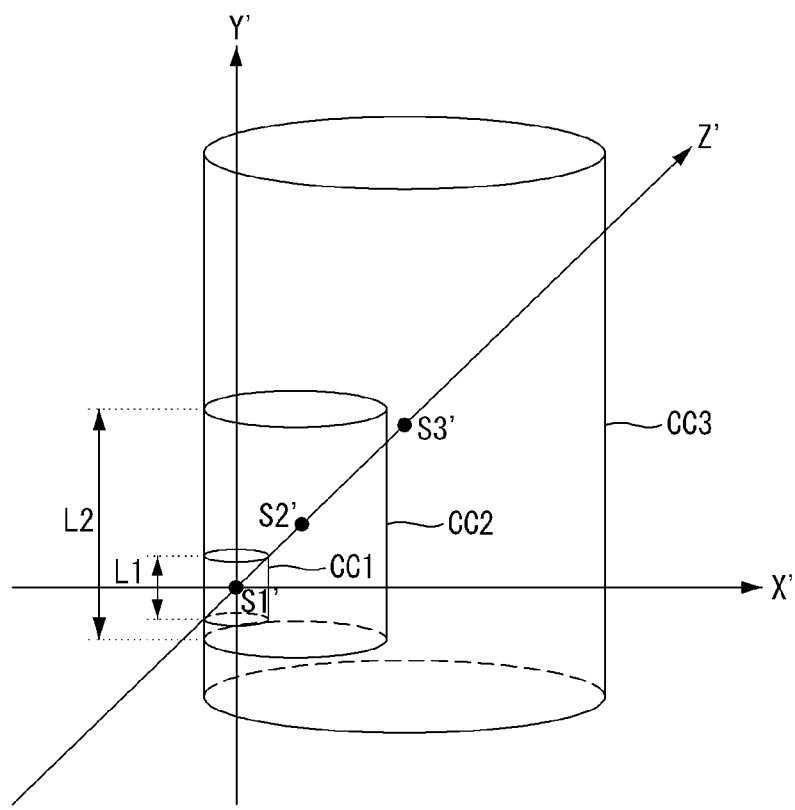

With reference to FIG. 17, if the user makes a gesture shown in FIG. 13 after a circular cylinder is displayed in the display 151, the controller 180 of the electronic device 100 magnifies the circular cylinder while moving the center of the circular cylinder in the positive direction of Z' axis which corresponds to the gesture.

At this time, the center S1 of the two hands in the configuration of FIG. 14(*a*) corresponds to the center S1' of the circular cylinder CC1 shown in FIG. 17, which is the origin of the coordinate system; the center S2 of both hands in the configuration of FIG. 14(*b*) corresponds to the center S2' of the magnified circular cylinder CC2 shown in FIG. 17; and the center S3 of both hands in the configuration of FIG. 14(*c*) corresponds to the center S3' of the magnified circular cylinder CC3 shown in FIG. 17.

Figure 18:
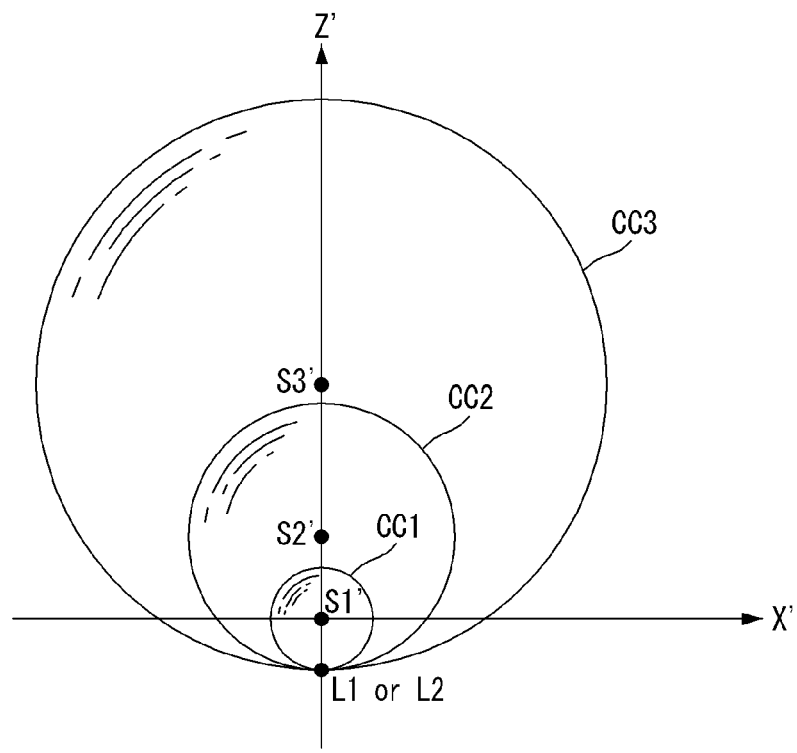

FIG. 18 shows circular cylinders of FIG. 17 viewed from the top of virtual space. With reference to FIGS. 17 and 18, the circular cylinder CC1 is inscribed in each of the magnified circular cylinders CC2, CC3 through a single line L1. Also, the magnified circular cylinders CC2, CC3 is inscribed in each other through another line L2 as well as the line L2. In other words, the controller magnifies the circular cylinder in the positive direction of Z axis. Therefore, the minimum depth along Z' axis that the user feels in association to the magnified circular cylinder is kept to be constant, namely the depth corresponding to the line L1.

Figure 19:
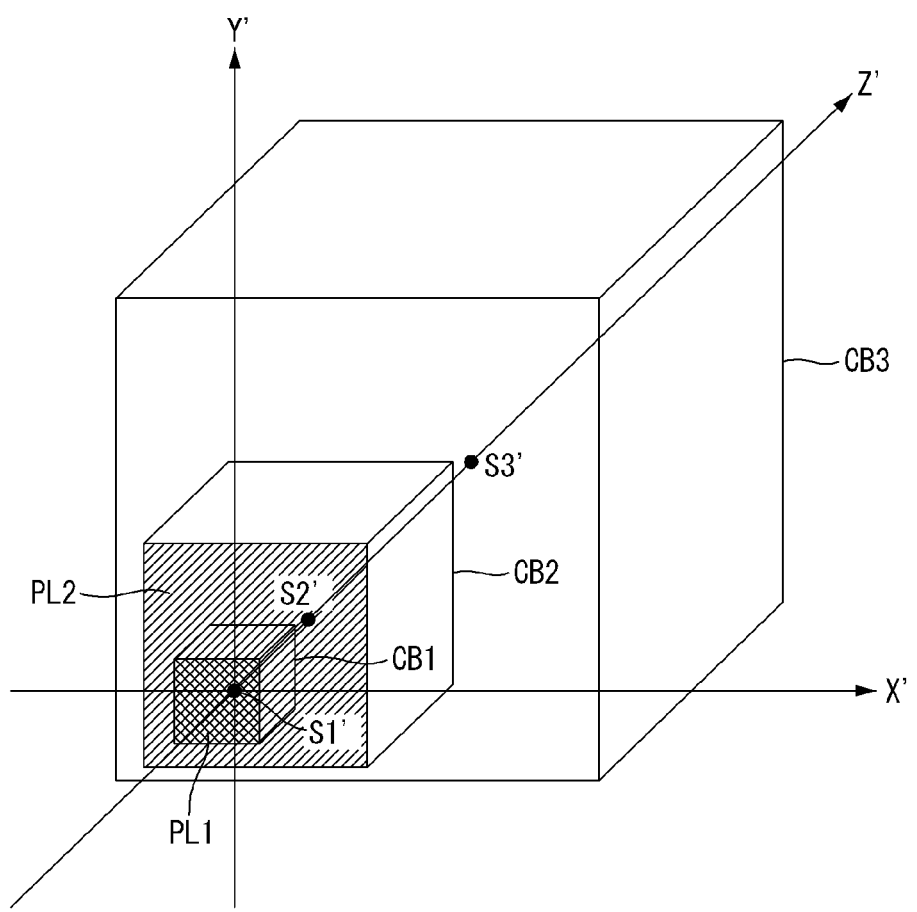

With reference to FIG. 19, if the user makes a gesture shown in FIG. 13 after a regular hexahedron CB1 is displayed on the display, the controller 180 of the electronic device 100 magnifies the regular hexahedron CB1 while moving the center of the regular hexahedron CB1 in the positive direction of Z' axis which corresponds to the gesture.

In the configuration of FIG. 14(*a*), the center S1 of both hands corresponds to the center S1' of the regular hexahedron CB1 shown in FIG. 19, which is the origin of the coordinate system. In the configuration of FIG. 14(*b*), the center S2 of the two hands corresponds to the center S2' of the magnified regular hexahedron CB2 shown in FIG. 19. In the configuration of FIG. 14(*c*), the center S3 of the two hands corresponds to the center S3' of the magnified regular hexahedron CB3 shown in FIG. 19.

Figure 20:
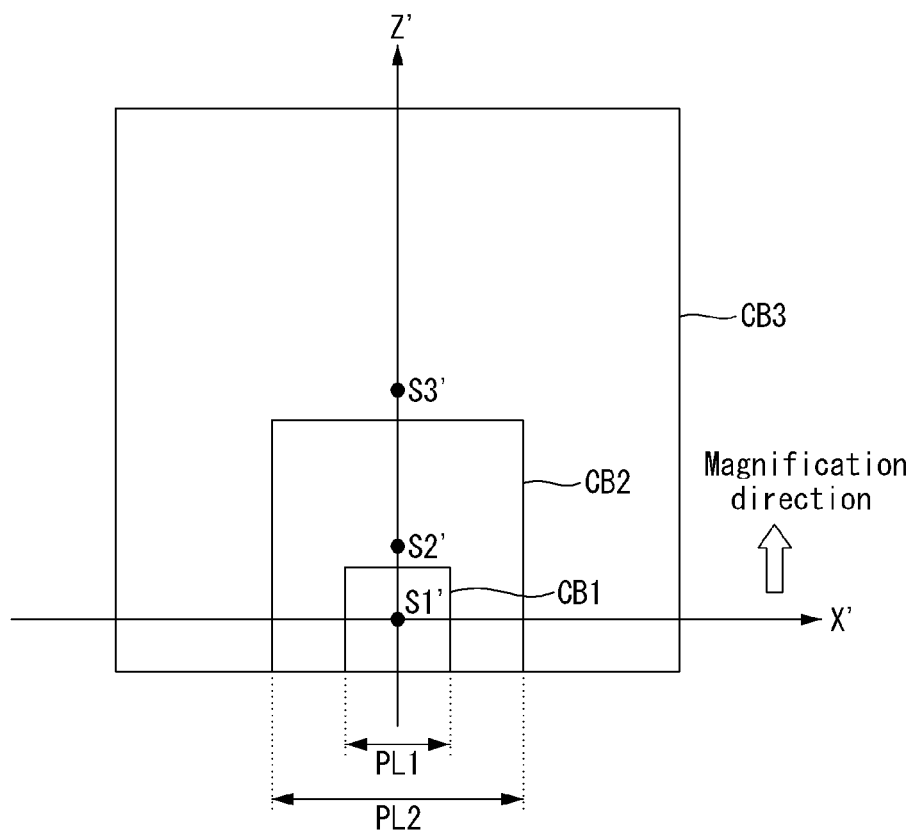

FIG. 20 shows regular hexahedrons of FIG. 19 views from the top of virtual space. With reference to FIGS. 19 and 20, the regular hexahedron CB1 is inscribed in each of magnified regular hexahedrons CB2, CB3 through a single plane PL1. Also, the regular hexahedron CB2, which is the smaller of the magnified regular hexahedrons CB2, CB3, is inscribed in the larger regular hexahedron CB3 through a larger plane PL2 including the plane PL1. In other words, the controller 180 magnifies the regular hexahedron CB1 only in the positive direction of Z' axis. Therefore, the minimum depth along Z' axis that the user feels in association to the magnified circular cylinder is kept to be constant, namely the depth corresponding to the plane PL1.

As described with reference to FIGS. 13 and 20, the magnification ratio of a stereoscopic image displayed on the display 151 can be changed in proportion to the movement distance of both hands 210, 220 forming the user's gesture. In other words, the controller 180 determines the magnification ratio for the stereoscopic image to be high in proportion to the movement distance of the center point between both hands 210, 220. On the contrary, however, the magnification ratio for the stereoscopic image can be set high in inverse proportion to the movement distance of the center point between both hands.

Different from the description given with reference to FIGS. 13 to 20, if the user shows directivity into Z' axis and makes a gesture of magnifying a stereoscopic image displayed on the display 151, the controller 180 can magnify the stereoscopic image while moving the center of the stereoscopic image in the negative direction of Z' axis.

At this time, the controller 180 can magnify the stereoscopic image while keeping the largest depth of the stereoscopic image to be constant. In other words, the controller can magnify the stereoscopic image to be inscribed in the magnified stereoscopic image through at least one point, line, or plane; the above should be easily understood by those skilled in the art based on the description with reference to FIGS. 13 to 20 and further description thereof will be omitted.

Figure 21:
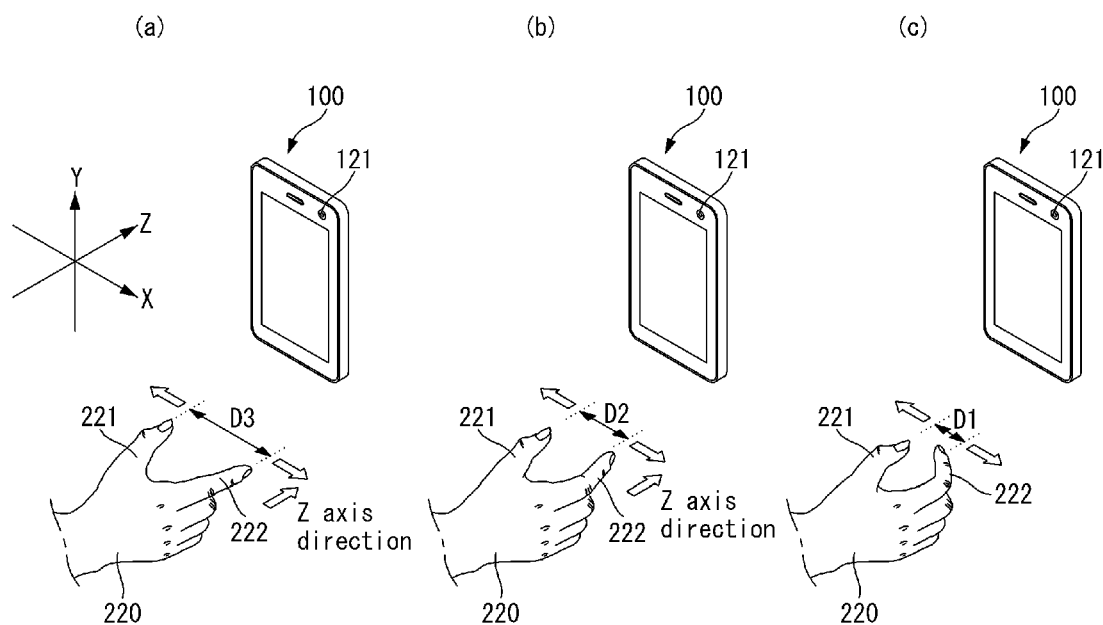
FIGS. 21 and 22 illustrate another procedure of the electronic device's recognizing the user's gesture and setting up a virtual axis along the direction corresponding to the recognized gesture according to the S210 to S220 steps of FIG. 12.
Figure 22:
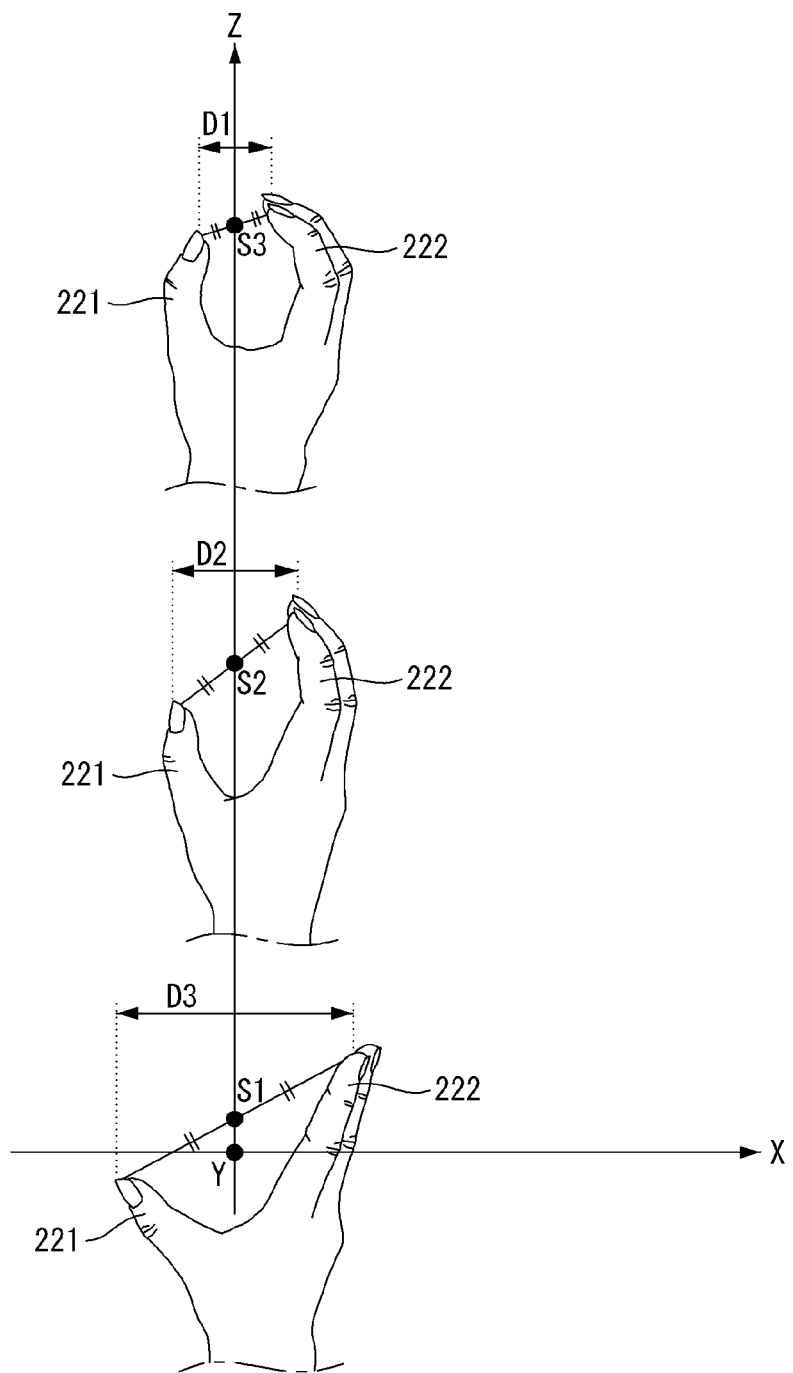

FIGS. 21 and 22 illustrate another procedure of the electronic device's recognizing the user's gesture and setting up a virtual axis along the direction corresponding to the recognized gesture according to the S210 to S220 steps of FIG. 12. With reference to FIG. 21, it can be known that the electronic device 100 is a handheld terminal capable of recognizing finger gesture of the user and based on the recognized gesture, scaling a stereoscopic image displayed on the display 151.

FIG. 21 illustrates a procedure of the user's making a gesture for scaling down a stereoscopic image by using a thumb 221 and an index finger 222 while moving his or her right hand 220 in the positive direction of Z axis. FIGS. 21 and 22 assume that the thumb 221 and the index finger 222 of the user's right hand are endowed with control and the user interface for finger gesture has been activated. It is further assumed that a center point between the thumb 221 and the index finger 222 of the right hand acts as a reference for determining the direction corresponding to the gesture.

In the configuration of FIG. 21(*a*), the distance between the fingers 221, 222 is D3; the user moves his or her hands in the direction of Z axis and approaches the fingers to each other in the direction of X axis. Then the configuration becomes that of FIG. 21(*b*) and the distance between the fingers 221, 222 becomes D2. In the configuration of FIG. 21(*b*), the distance between the fingers 221, 222 is D2 and the user moves the fingers 221, 222 in the positive direction of Z axis and approaches the fingers in the direction of X axis.

Then the configuration becomes that of FIG. 21(*c*) and the distance between the fingers 221, 222 becomes D1. In other words, as shown in FIG. 21, the controller 180 recognizes the positive direction of Z axis as the direction corresponding to the user's gesture and determines the type of the user's gesture by approaching the user's fingers 221, 222 toward each other. Once the direction corresponding to the user's gesture and the type of the gesture are recognized, the controller 180 can set up the Z axis as a virtual axis corresponding to the gesture.

Although FIG. 22 assumed that middle points S1, S2, S3 between the user's fingers 221, 222 acts as a criterion to determine the direction of the gesture, the scope of the present invention is not limited to the above assumption. For example, an arbitrary point between the fingers 221, 222 can act as the criterion for determining the direction corresponding to the gesture.

FIGS. 23 to 28 illustrate examples of an electronic device 100 according to an embodiment of the present invention scaling down stereoscopic images in response to the user's gesture. In what follows, under the assumption that the gesture illustrated in FIGS. 21 and 22, namely, the gesture approaching the fingers 221, 222 toward each other while moving the fingers 221, 222 along Z axis indicates reducing the stereoscopic image, examples of scaling down the stereoscopic image will be described. It is further assumed that the coordinate system of FIGS. 23 to 28 in which stereoscopic images are displayed is a virtual coordinate system where stereoscopic images are displayed on the display 151; and the center of the stereoscopic images corresponds to the center point between the user's fingers 221, 222.

Figure 23:
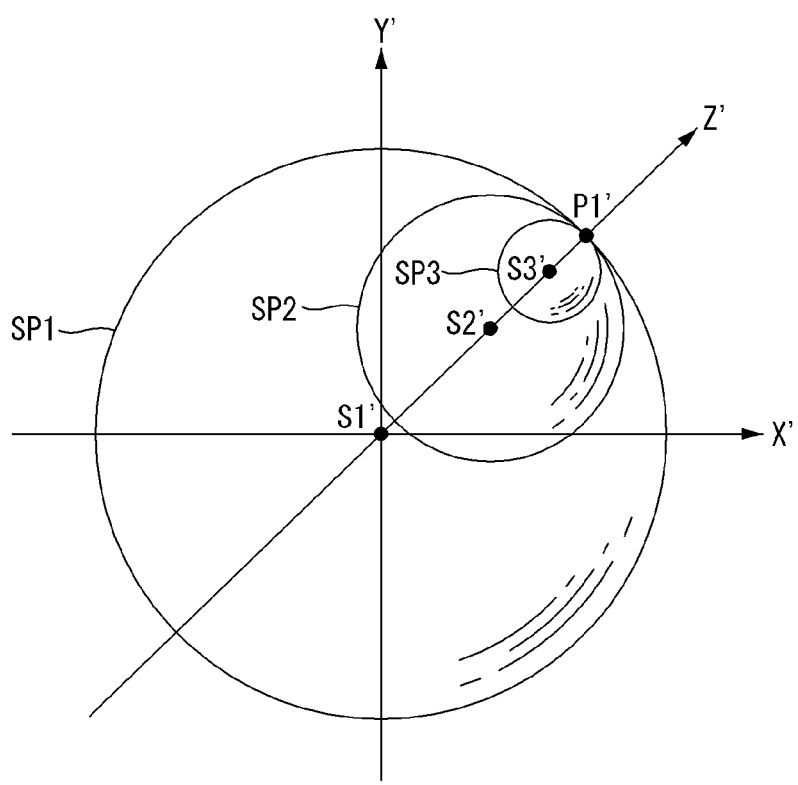
FIGS. 23 to 28 illustrate examples of an electronic device according to an embodiment of the present invention scaling down stereoscopic images in response to the user's gesture.

With reference to FIG. 23, if the user makes a gesture shown in FIG. 21 after the sphere SP1 is displayed in the display 151, the controller 180 of the electronic device 100 reduces the sphere while moving the center of the sphere in the positive direction of Z' axis which is the direction corresponding to the gesture.

At this time, the center S1 of the fingers 221, 222 in the configuration of FIG. 21(a) corresponds to the center S1' of the sphere SP1 illustrated in FIG. 23, which is the origin of the coordinate system; the center S2 of the fingers 221, 222 in the configuration of FIG. 21(b) corresponds to the center S2' of the scaled-down sphere SP2 illustrated in FIG. 23; the center S3 of the fingers 221, 222 in the configuration of FIG. 21(c) corresponds to the center S3' of the scaled-down sphere SP3 illustrated in FIG. 23.

Figure 24:
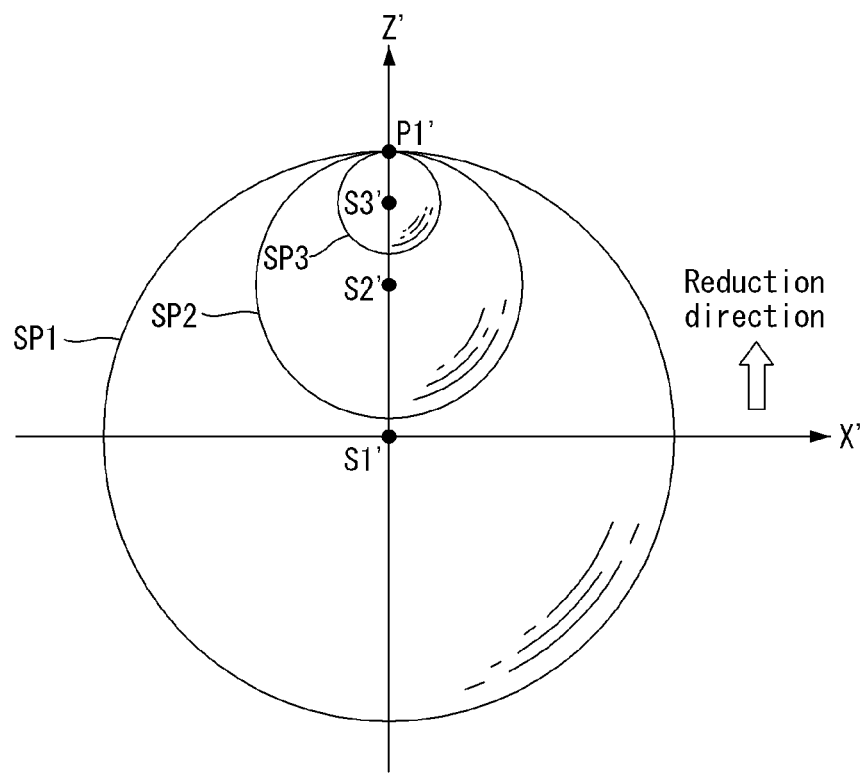

FIG. 24 illustrates spheres of FIG. 23 viewed from the top of virtual space. With reference to FIGS. 23 and 24, reduced spheres SP2, SP3 are inscribed in the sphere SP1 through a single point P1. The smaller SP3 of the reduced spheres SP2, SP3 is also inscribed in the sphere SP1 and the larger SP2 of the two reduced spheres. In other words, it can be known that the controller 180 reduces the sphere by moving the sphere in the positive direction of Z' axis while keeping the maximum depth to be the depth of the point P1.

Figure 25:
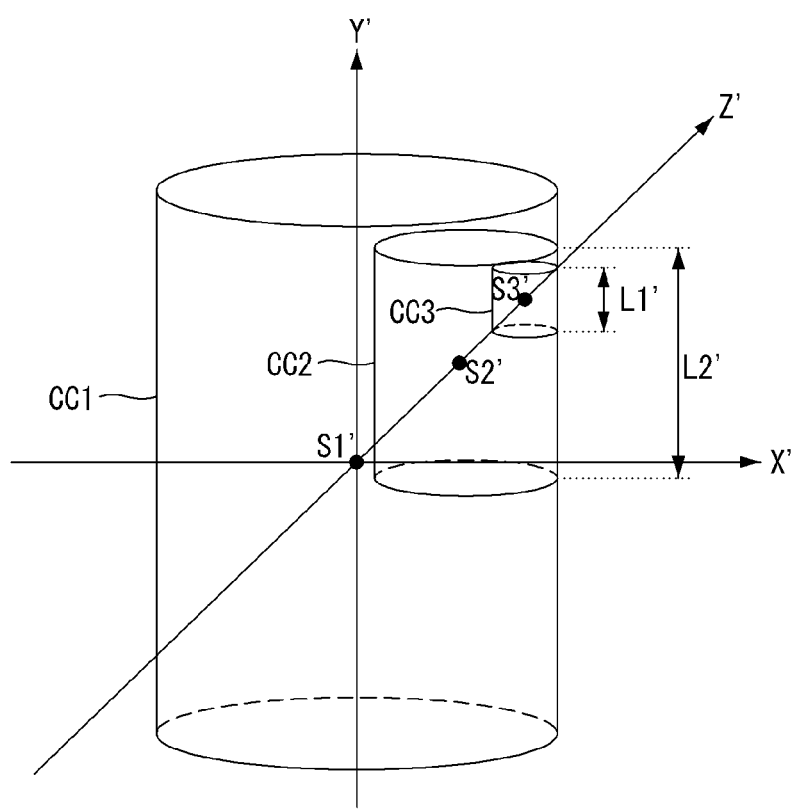

With reference to FIG. 25, if the user makes a gesture shown in FIG. 21 after a circular cylinder is displayed on the display 151, the controller 180 of the electronic device 100 reduces the circular cylinder while moving the center of the circular cylinder in the positive direction of Z axis which is the direction corresponding to the gesture.

At this time, the center S1 of the fingers 221, 222 in the configuration of FIG. 21(a) corresponds to the center S1' of the circular cylinder CC1 illustrated in FIG. 25, which is the origin of the coordinate system; the center S2 of the fingers 221, 222 in the configuration of FIG. 21(b) corresponds to the center S2' of the magnified circular cylinder CC2 illustrated in FIG. 25; the center S3 of the fingers 221, 222 in the configuration of FIG. 21(c) corresponds to the center S3' of the magnified circular cylinder CC3 illustrated in FIG. 25.

Figure 26:
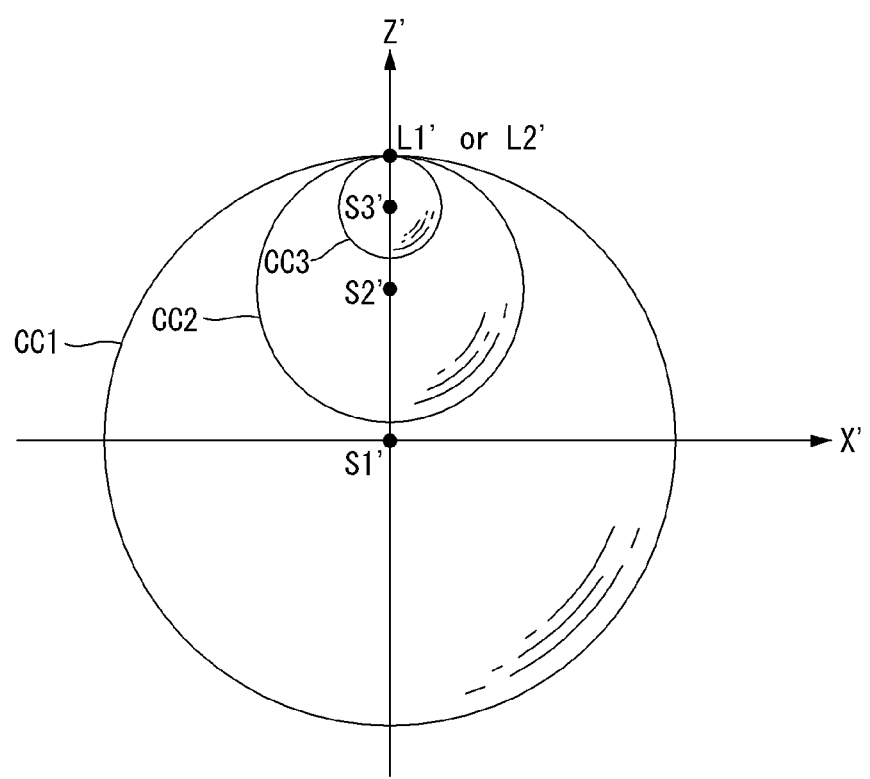

FIG. 26 illustrates circular cylinders of FIG. 25 viewed from the top of virtual space. With reference to FIGS. 25 and 26, the circular cylinder CC1 is inscribed in the magnified spheres CC2, CC3 through a line L1' or L2'. It can be known that the smaller CC3 of the magnified circular cylinders CC2, CC3 is inscribed in the larger circular cylinder CC2 through another line L1'.

In other words, the controller 180 can reduce the circular cylinders by taking account of the direction corresponding to the user's gesture and reduce the circular cylinder based on a particular depth associated with the direction. Therefore, the user's impression on the maximum depth of a reduced circular cylinder along Z' axis is kept to be constant as the depth including a particular line L1 or L2.

Figure 27:
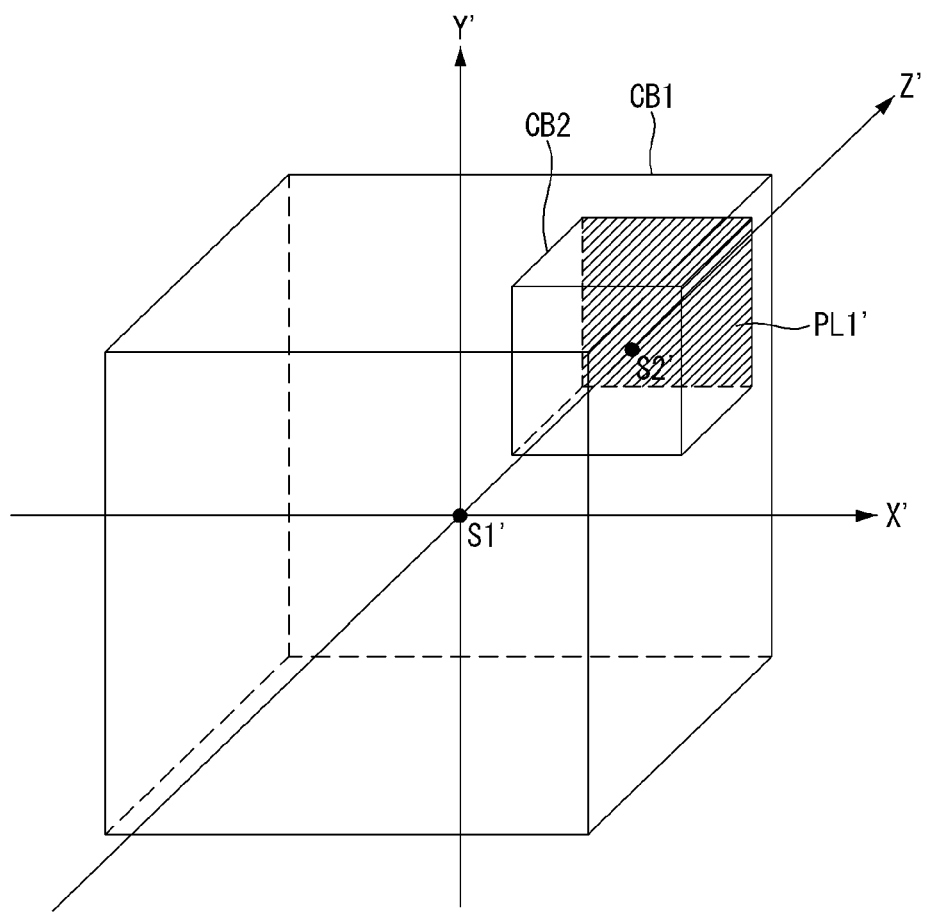

With reference to FIG. 27, if the user makes a gesture illustrated in FIG. 21 after a regular hexahedron CB1 is displayed on the display 151, the controller 180 of the electronic device 100 reduces the regular hexahedron CB1 while moving the center of the regular hexahedron CB1 in the positive direction of Z' axis which is the direction corresponding to the gesture.

At this time, the center S1 of the fingers 221, 222 in the configuration of FIG. 21(a) corresponds to the center S1' of the regular hexahedron CB1 illustrated in FIG. 27, which is the origin of the coordinate system; the center S2 of the fingers 221, 222 in the configuration of FIG. 21(b) corresponds to the center S2' of the reduced regular hexahedron CB2 illustrated in FIG. 27; the center S3 of the fingers 221, 222 in the configuration of FIG. 21(c) corresponds to the center S3' of the reduced regular hexahedron CB3 illustrated in FIG. 27.

Figure 28:
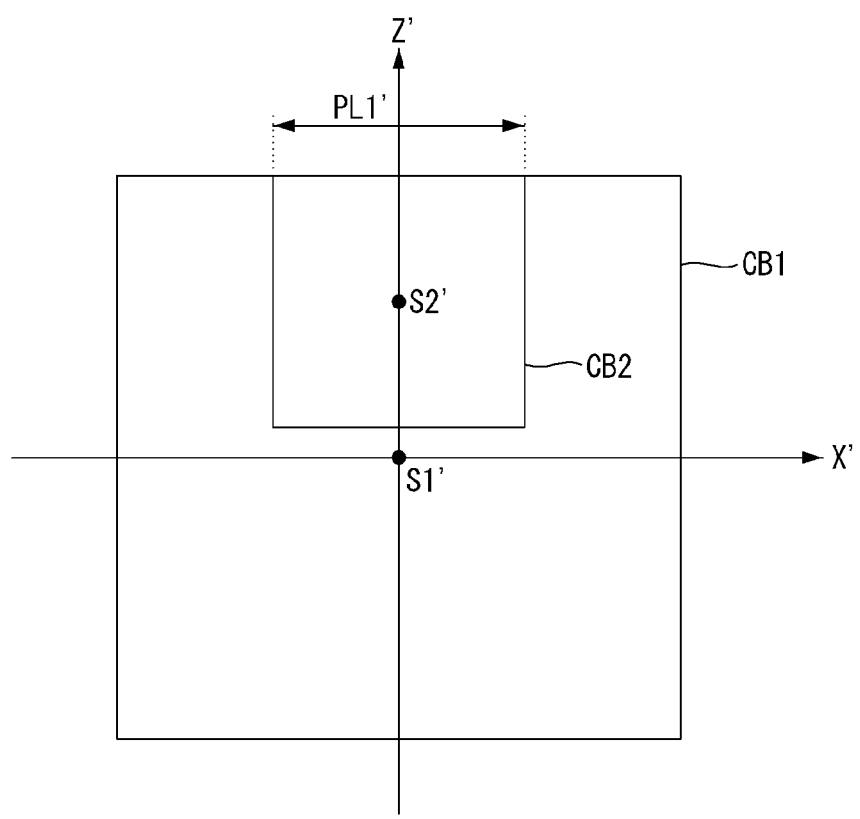

FIG. 28 illustrates regular hexahedrons of FIG. 27 viewed from the top of virtual space. With reference to FIGS. 27 and 28, the regular hexahedron CB1 is inscribed in the magnified regular hexahedrons CB2, CB3 through a plane PL1'. In other words, the controller 180 reduces a regular hexahedron CB1 along the positive direction of Z' axis. Therefore, it can be known that the user's impression on the maximum depth of a reduced regular hexahedron along Z' axis is kept to be constant as the depth including the plane PL1.

As described above with reference to FIGS. 21 to 28, the reduction ratio of a stereoscopic image displayed on the display 151 can be changed in proportion to the movement distance of both hands 210, 220 generating the user's gesture. In other words, the controller 180 sets the reduction ratio for the stereoscopic image to be large in proportion to the movement distance of the center point between both hands 210, 220. On the other hand, the controller 180 can also set the reduction ratio for the stereoscopic image to be large in inverse proportion to the movement distance of the center point between both hands.

On the contrary to the description with reference to FIGS. 21 to 28, if the user shows a negative direction of Z axis and makes a gesture for reducing a stereoscopic image displayed on the display 151, the controller 180 can reduce the stereoscopic image while moving the center of the stereoscopic image in the negative direction of Z' axis.

At this time, the controller 180 can reduce the stereoscopic image while keeping the minimal depth to be the minimal depth of the stereoscopic image. In other words, the controller 180 can reduce the stereoscopic image in such a way that the reduced stereoscopic image is inscribed in the stereoscopic image through a single point, line, or plane. This property can be easily derived by those skilled in the art based on the description provided with respect to FIGS. 21 to 28; therefore, a detailed description thereof will be omitted.

Figure 29:
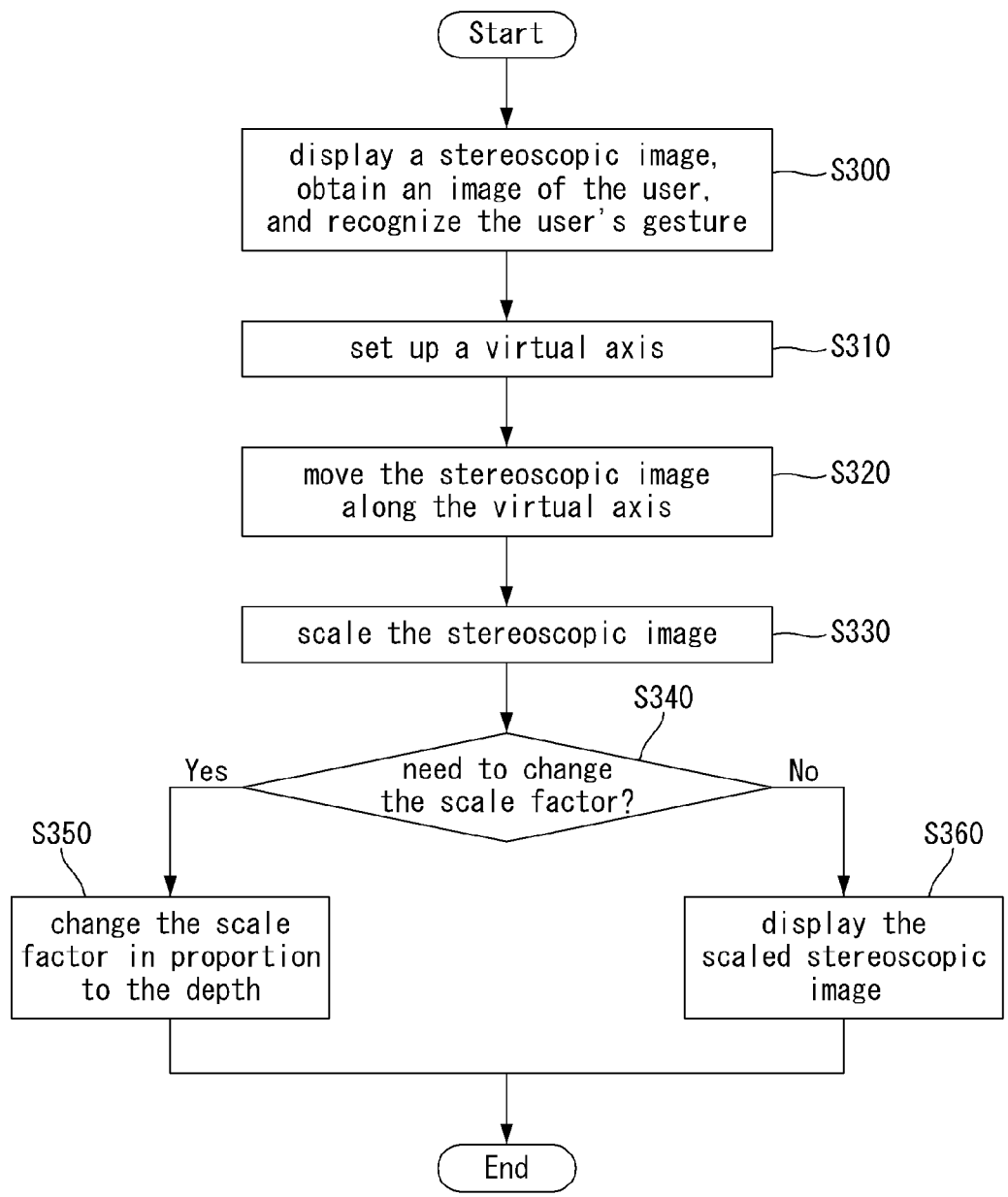
FIG. 29 is a flow diagram illustrating a method for displaying stereoscopic images of an electronic device according to another embodiment of the present invention.

FIG. 29 is a flow diagram illustrating a method for displaying stereoscopic images of an electronic device 100 according to another embodiment of the present invention. In what follows, a method for displaying stereoscopic images of the electronic device 100 will be described with reference to associated drawings.

The controller 180 of the electronic device 100 displays stereoscopic images and obtains the image of the user through the camera 121 and recognizes the user's gesture by analyzing the image of the user S310. Once the user's gesture is recognized, the controller 180 sets up a virtual axis based on the direction corresponding to the gesture recognized S310.

When the virtual axis is set up based on the gesture recognized, the controller 180 performs scaling of the stereoscopic images S330 while moving the stereoscopic images along the virtual axis S320. In other words, the controller 180 can scale up or down the stereoscopic images based on the type of the gesture recognized while moving the center of the stereoscopic image along the virtual axis along the direction corresponding to the gesture recognized.

Next, the controller 180 determines S340 whether it is necessary to change a scale factor of the stereoscopic image scaled based on the type of the recognized gesture in proportion to the depth along the direction of the virtual axis. If changing the scale factor of the scaled stereoscopic image is found to be required, the controller 180 can change the scale factor of the scaled stereoscopic image in proportion to the depth along the virtual axis. If not, however, the controller 180 leaves the scaled stereoscopic image intact, displaying the scaled stereoscopic image on the display 151, S360.

In the example of FIG. 29, the controller 180 first performs scaling of the stereoscopic image and changes the scale factor of the scaled stereoscopic image in proportion to the depth along the virtual axis. However, the controller 180, without carrying out the scaling of the stereoscopic image, can apply a scale factor to the stereoscopic image, the scale factor being determined in proportion to the depth along the virtual axis.

Figure 30:
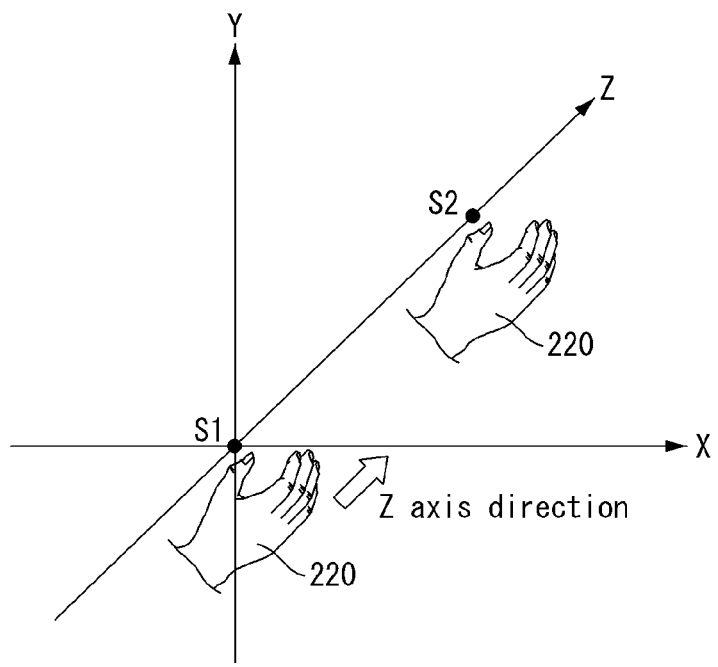
FIG. 30 is one example of the user's gesture for changing a scale factor of stereoscopic images in proportion to the depth along a virtual axis according to a method for displaying stereoscopic images of an electronic device shown in FIG. 29.

FIG. 30 is one example of the user's gesture for changing a scale factor of stereoscopic images in proportion to the depth along a virtual axis according to a method for displaying stereoscopic images of an electronic device 100 shown in FIG. 29. In FIG. 30, it is assumed that the user's right hand 220 is endowed with control; the direction corresponding to the user's gesture is recognized based on the direction of the right hand 220; and the type of the user's gesture is determined by the shape of the right hand. The assumption above applies the same to FIGS. 33, 36, and 39, which will be described later.

With reference to FIG. 30, the user moves his or her right hand 220 with fingers of the right hand 220 spread in the positive direction of Z axis. The controller 180 can then set up a virtual Z' axis as the virtual axis based on the user's gesture.

In FIG. 30, since the user moves his or her right hand 220 in the positive direction of Z axis, the controller 180 sets up the Z' axis corresponding to Z axis as a virtual axis which corresponds to the user's gesture. However, if the user moves his or her right hand 220 in an arbitrary direction of the three-dimensional space, the controller 180 can establish a virtual axis which corresponds to the arbitrary direction. This property can be applied the same to FIGS. 33, 36, and 39, which will be described later.

In what follows, examples of displaying a stereoscopic image of the electronic device 100 will be described with the assumption that the user's gesture increases a scale factor of the stereoscopic image in proportion to the depth along Z axis.

Figure 31:
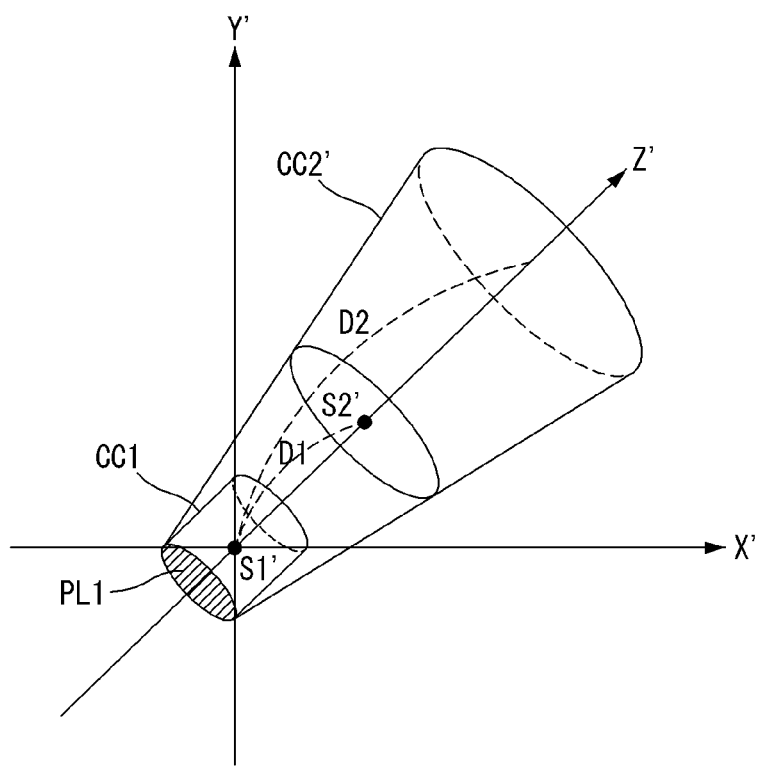
FIGS. 31 and 32 are examples of an electronic device's controller displaying stereoscopic images based on the user's gesture shown in FIG. 30.
Figure 32:
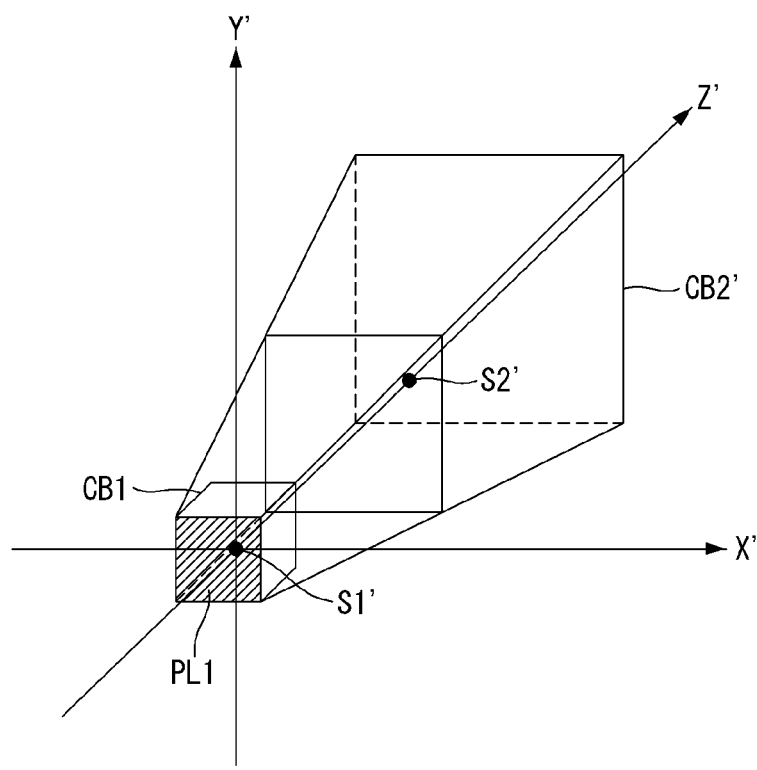

FIGS. 31 and 32 are examples of an electronic device's 100 controller 180 displaying stereoscopic images based on the user's gesture shown in FIG. 30. The coordinate system based on which stereoscopic images of FIGS. 31 and 32 are displayed is a virtual coordinate system where the stereoscopic images are displayed on the display 151; and the center of the stereoscopic image corresponds to the position of the user's right hand 220. This setting will be applied the same to FIGS. 34 to 35, FIGS. 37 to 38, and FIGS. 40 to 41, which will be described later.

With reference to FIG. 31, if the user makes a gesture illustrated in FIG. 30 after a circular cylinder CC1 is displayed on the display 151, the controller 180 of the electronic device 100 moves the center of the circular cylinder in the positive direction of Z axis which is the direction corresponding to the user's gesture and increase the scale factor in proportion to the depth along the direction of Z axis.

In other words, with reference to FIG. 31, the controller 180 sets the scale factor to be 1 for the depth along Z' axis which corresponds to one plane PL1 of the circular cylinder CC1, while the scale factor of the plane corresponding to the point where the depth in the positive direction of Z' axis is D1 is set to be smaller than that of the plane corresponding to the point where the depth in the direction of Z' axis is D2.

In other words, the controller 180, in response to the user's gesture, scales the circular cylinder CC1 to be a three-dimensional object close to a cone CC2'. In addition, the circular cylinder CC1 is inscribed in the three-dimensional object CC2' scaled through a particular plane PL1.

At this time, the position S1 of the right hand 220 in the configuration of (a) in FIG. 30 corresponds to the center S1' of the circular cylinder CC1 illustrated in FIG. 32, which is the origin of the coordinate system, while the position S2 of the right hand 220 in the configuration of (b) in FIG. 30 corresponds to the center S2' of the scaled figure CB2' illustrated in FIG. 32. This feature can also be applied to FIGS. 35, 38, and 41, which will be described later.

If the controller 180 sets up the scale factor of the regular hexahedron CB1 in proportion to the depth in the positive direction of Z' axis in response to the user's gesture shown in FIG. 30, the controller 180 can magnify or reduce the circular cylinder CC1 while keeping the shape thereof. This feature can also be applied to FIGS. 35, 38, and 41, which will be described later.

Figure 33:
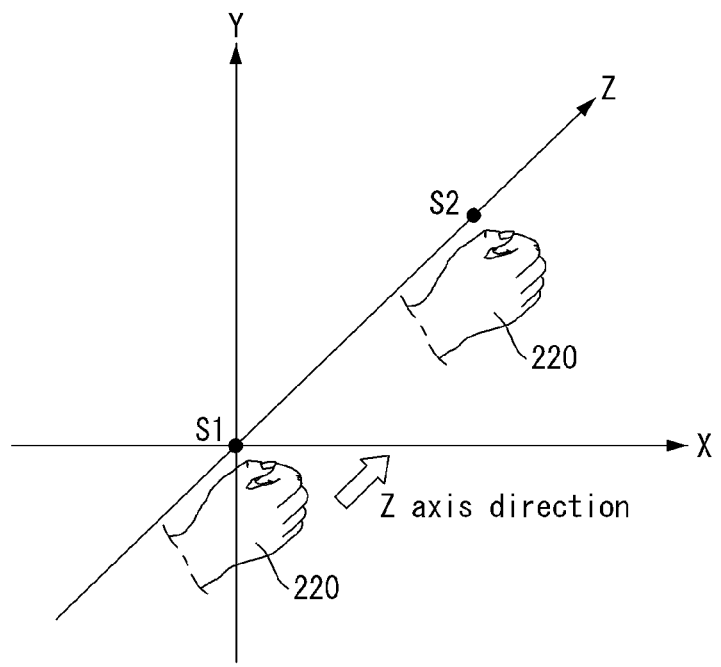
FIG. 33 is another example of the user's gesture for changing a scale factor of stereoscopic images in proportion to the depth along a virtual axis according to a method for displaying stereoscopic images of an electronic device shown in FIG. 29.

FIG. 33 is another example of the user's gesture for changing a scale factor of stereoscopic images in proportion to the depth along a virtual axis according to a method for displaying stereoscopic images of an electronic device 100 shown in FIG. 29. With reference to FIG. 33, it can be known that the user moves his or her right hand 220 in the positive direction of Z axis while closing the user's right hand 220. The controller 180 then can set up a virtual Z' axis as the virtual axis based on the user's gesture.

In the following, under the assumption that the user's gesture reduces the scale factor of the stereoscopic image in proportion to the depth along Z axis, described are examples of the electronic device's 100 displaying stereoscopic images.

Figure 34:
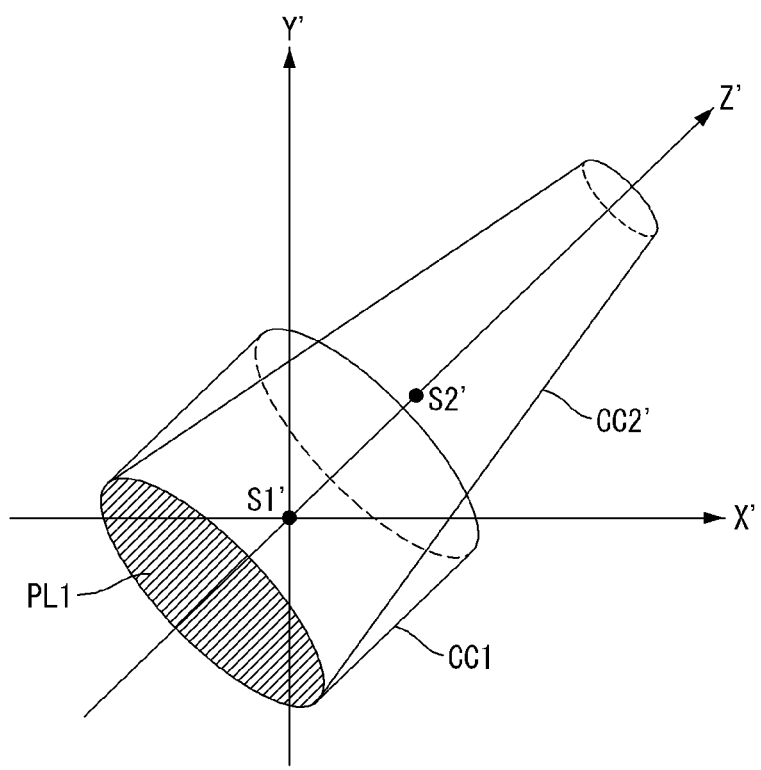
FIGS. 34 and 35 are examples of an electronic device's controller displaying stereoscopic images based on the user's gesture shown in FIG. 33.
Figure 35:
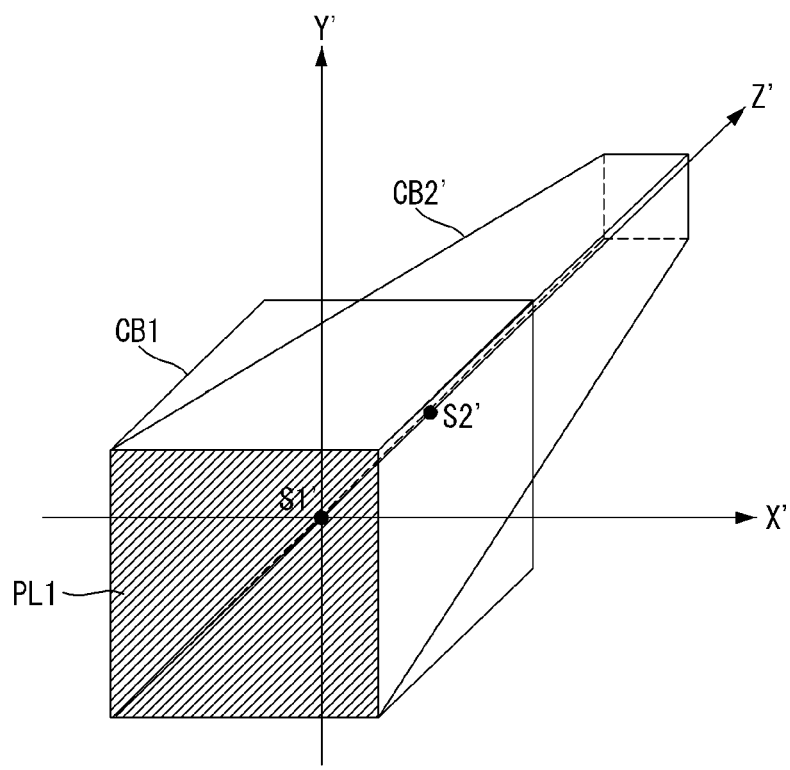

FIGS. 34 and 35 are examples of an electronic device's 100 controller 180 displaying stereoscopic images based on the user's gesture shown in FIG. 33.

With reference to FIG. 34, when the user makes a gesture shown in FIG. 33 after a circular cylinder CC1 is displayed on the display 151, the controller 180 of the electronic device 100 moves the center of the circular cylinder in the positive direction of Z' axis which corresponds to the gesture and reduces the scale factor as the depth along Z' axis increases.

In other words, with reference to FIG. 34, the controller 180 sets the scale factor to be 1 for the depth along Z' axis which corresponds to one plane PL1 of the circular cylinder CC1, while the scale factor is gradually reduced to have a value smaller than 1 in proportion to the depth in the positive direction of Z' axis. Also, it can be known that the circular cylinder CC1 is inscribed in the scaled three-dimensional object CC2' through the particular plane PL1.

With reference to FIG. 35, if the user makes a gesture shown in FIG. 33 after a regular hexahedron CB1 is displayed on the display 151, the controller 180 of the electronic device 100 moves the center of the regular hexahedron CB1 in the positive direction of Z' axis which corresponds to the gesture and reduces the scale factor in proportion to the depth along Z' axis.

In other words, with reference to FIG. 35, the controller 180 sets the scale factor to be 1 for the plane located at the distance corresponding to one plane PL1 of the regular hexahedron CB1 and reduces the scale factor in proportion to the depth in the positive direction of Z' axis. Also, it can be known that the regular hexahedron CB1 is inscribed in the scaled three-dimensional object CB2' through the particular plane PL1.

Figure 36:
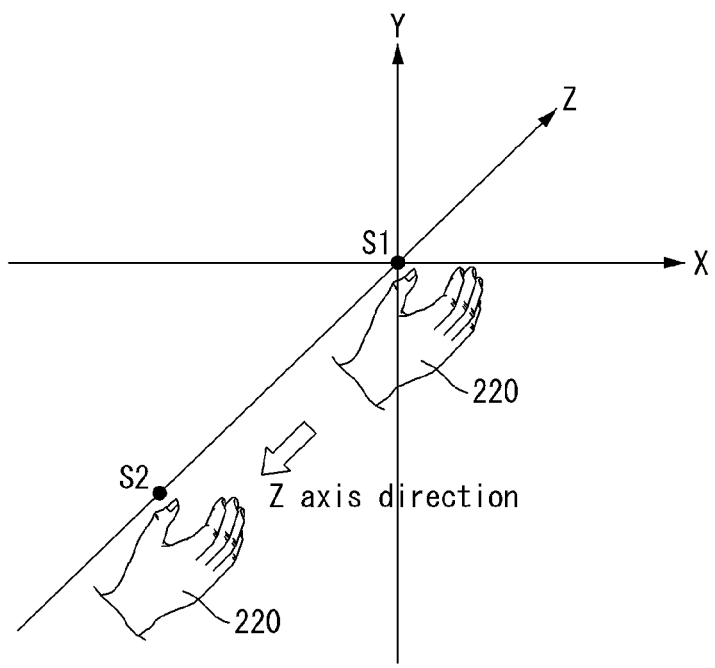
FIG. 36 is yet another example of the user's gesture for changing a scale factor of stereoscopic images in proportion to the depth along a virtual axis according to a method for displaying stereoscopic images of an electronic device shown in FIG. 29.

FIG. 36 is yet another example of the user's gesture for changing a scale factor of stereoscopic images in proportion to the depth along a virtual axis according to a method for displaying stereoscopic images of an electronic device 100 shown in FIG. 29. With reference to FIG. 36, it can be known that the user moves his or her right hand 220 backward in the negative direction of Z axis while spreading the user's right hand 220. The controller 180 then can set up the virtual Z' axis as a virtual axis based on the user's gesture.

In the following, under the assumption that the user's gesture reduces the scale factor of the stereoscopic image in proportion to the depth in the positive direction of Z axis, described are examples of the electronic device's 100 displaying stereoscopic images.

Figure 37:
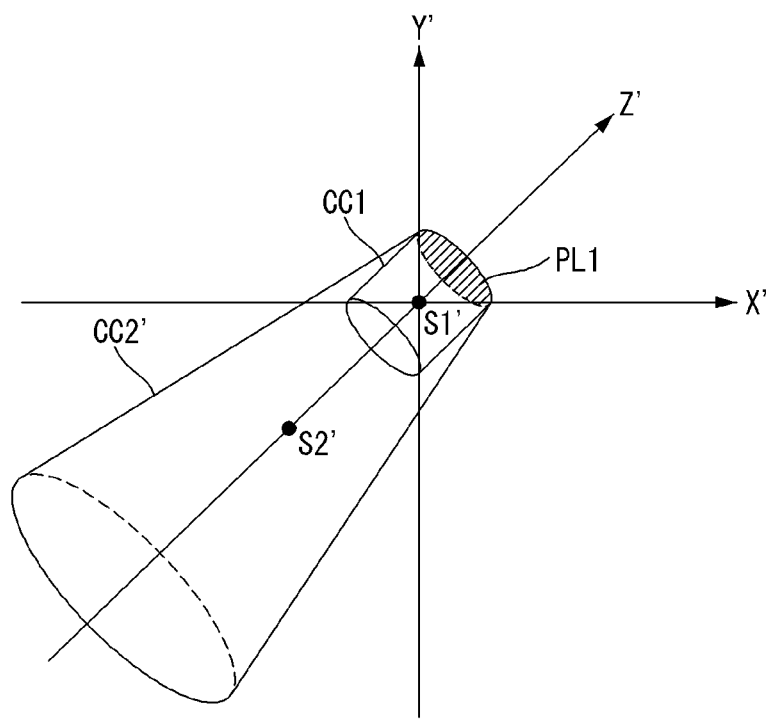
FIGS. 37 and 38 are examples of an electronic device's controller displaying stereoscopic images based on the user's gesture shown in FIG. 33.
Figure 38:
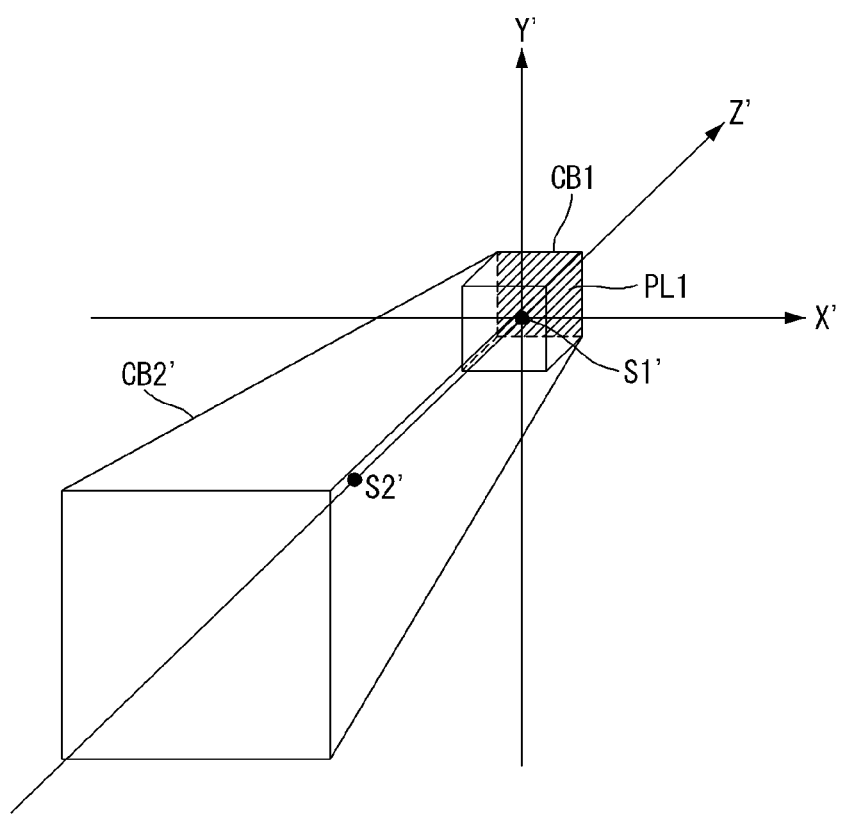

FIGS. 37 and 38 are examples of an electronic device's 100 controller 180 displaying stereoscopic images based on the user's gesture shown in FIG. 33.

With reference to FIG. 37, if the user makes a gesture shown in FIG. 36 after a circular cylinder CC1 is displayed on the display 151, the controller 180 of the electronic device 100 moves the center of the circular cylinder CC1 in the negative direction of Z' axis which is the direction corresponding to the gesture and reduces the scale factor in proportion to the depth in the positive direction of Z' axis.

In other words, with reference to FIG. 37, the controller 180 gradually reduces the scale factor in proportion to the depth in the positive direction of Z' axis and sets the scale factor to be 1 for the depth where the depth along Z' axis corresponds to one plane PL1 of the circular cylinder CC1. Also, it can be known that the circular cylinder CC1 is inscribed in the scaled three-dimensional object CC2' through the particular plane PL1.

With reference to FIG. 38, if the user makes a gesture shown in FIG. 36 after a regular hexahedron CB1 is displayed on the display 151, the controller 180 of the electronic device 100 moves the center of the regular hexahedron CB1 in the negative direction of Z' axis which corresponds to the gesture and reduces the scale factor in proportion to the depth in the positive direction of Z' axis.

In other words, the controller 180 reduces the scale factor in proportion to the depth in the positive direction of Z' axis and sets the scale factor to be 1 for the location where the depth along the Z' axis corresponds to one plane PL1 of the regular hexahedron CB1. Also, it can be known that the regular hexahedron CB1 is inscribed in a scaled three-dimensional object CB2' through the particular plane PL1.

Figure 39:
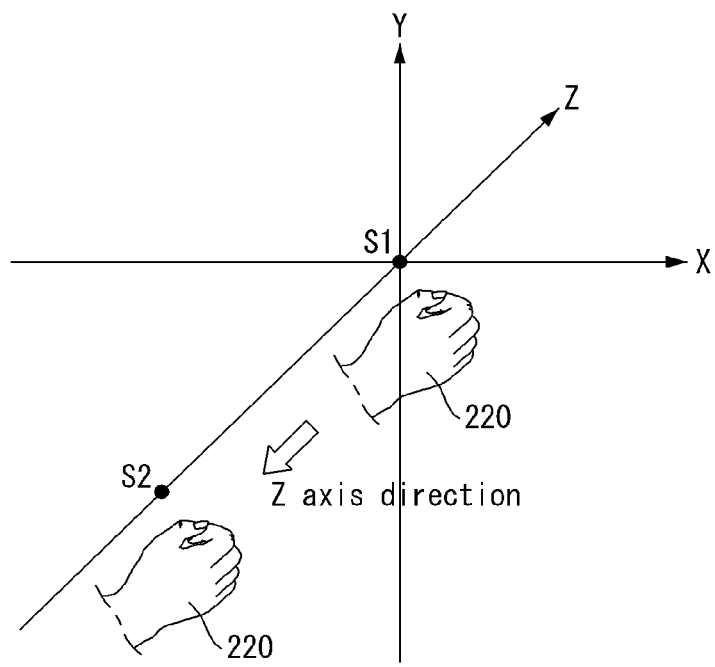
FIG. 39 is still another example of the user's gesture for changing a scale factor of stereoscopic images in proportion to the depth along a virtual axis according to a method for displaying stereoscopic images of an electronic device shown in FIG. 29.

FIG. 39 is still another example of the user's gesture for changing a scale factor of stereoscopic images in proportion to the depth along a virtual axis according to a method for displaying stereoscopic images of an electronic device 100 shown in FIG. 29. With reference to FIG. 39, it can be known that the user moves his or her right hand 220 in the negative direction of Z axis while closing the user's right hand 220. The controller 180 then can set up a virtual Z' axis as the virtual axis based on the user's gesture.

In the following, under the assumption that the user's gesture reduces the scale factor of the stereoscopic image in proportion to the depth along Z' axis, described are examples of the electronic device's 100 displaying stereoscopic images.

Figure 40:
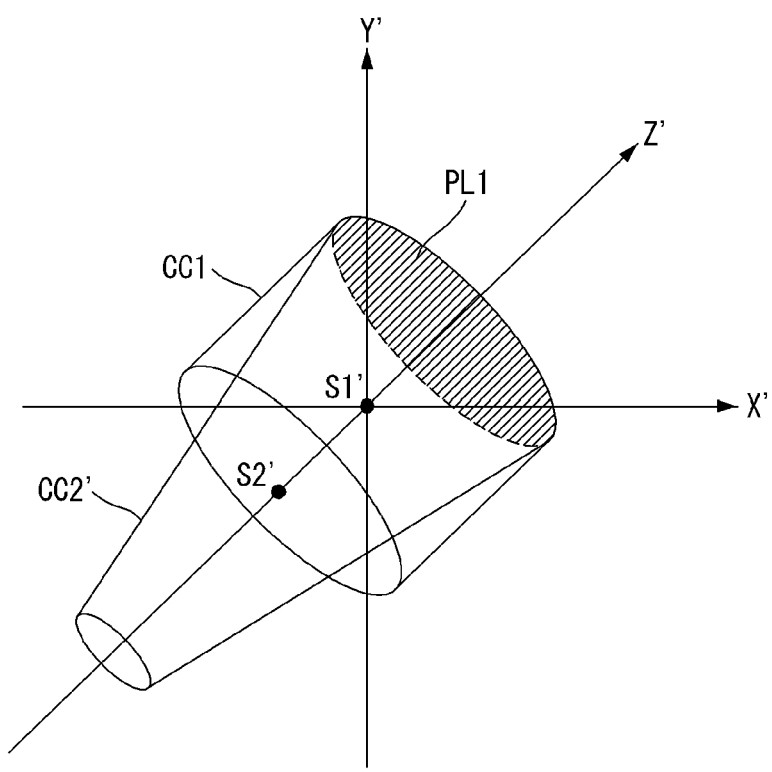
FIGS. 40 and 41 are examples of an electronic device's controller displaying stereoscopic images based on the user's gesture shown in FIG. 39.
Figure 41:
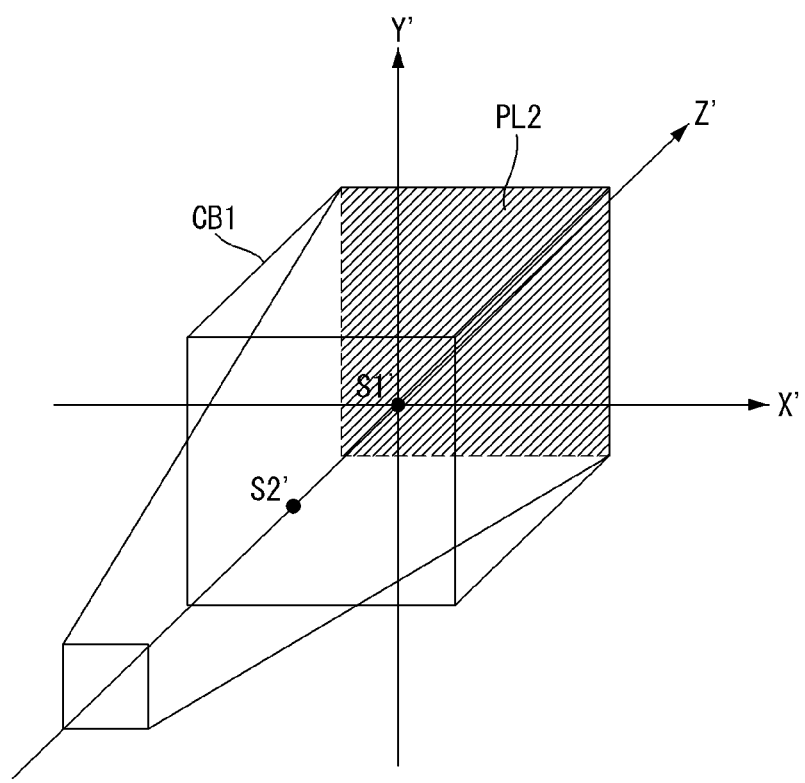

FIGS. 40 and 41 are examples of an electronic device's controller displaying stereoscopic images based on the user's gesture shown in FIG. 39.

With reference to FIG. 40, when the user makes a gesture shown in FIG. 39 after a circular cylinder CC1 is displayed on the display 151, the controller 180 of the electronic device 100 moves the center of the circular cylinder in the negative direction of Z' axis which corresponds to the gesture and increases the scale factor in proportion to the depth in the positive direction of Z' axis.

In other words, with reference to FIG. 40, the controller 180 gradually increases the scale factor in proportion to the depth in the positive direction of Z' axis and sets the scale factor to be 1 for the location where the depth on the Z' axis corresponds to one plane PL1 of the circular cylinder CC1. Also, it can be known that the circular cylinder CC1 is inscribed in a scaled three-dimensional object CC2' through the particular plane PL1.

With reference to FIG. 41, if the user makes a gesture shown in FIG. 39 after a regular hexahedron CB1 is displayed on the display 151, the controller 180 of the electronic device 100 moves the center of the regular hexahedron CB1 in the negative direction of Z' axis which corresponds to the gesture and increases the scale factor in proportion to the depth in the positive direction of Z' axis.

In other words, the controller 180 gradually increase the scale factor in proportion to the depth in the positive direction of Z' axis and sets the scale factor to be 1 for the location where the depth on the Z' axis corresponds to the depth corresponding to one plane PL1 of the regular hexahedron CB1. Also, it can be known that the regular hexahedron CB1 is inscribed in a scaled three-dimensional object CB2' through the particular plane PL1.

When an image of the user is obtained through the camera 121, S400, the controller 180 of the electronic device 100 analyzes the obtained image and identifies positions of the middle point between both hands of the user at a first time and a second time, respectively. At this time, the first time is the starting time point for the controller 180 to recognize a gesture of the user, while the second time is the ending time point to recognize a gesture of the user.

Next, the controller 180 matches the middle point between both hands at the first time to the middle point in the stereoscopic image displayed on the display 151, S420 and sets a virtual line connecting the middle point of the stereoscopic image and a virtual point corresponding to the middle point between both hands at the second time S430.

At this time, the controller 180, between the first and the second time, can magnify the stereoscopic image as the distance between both hands is increased, while reducing the stereoscopic image as the distance between the two hands is decreased. However, the scope of the present invention is not limited to the above description. The above feature can also be applied to FIG. 43 which will be described below.

Figure 42:
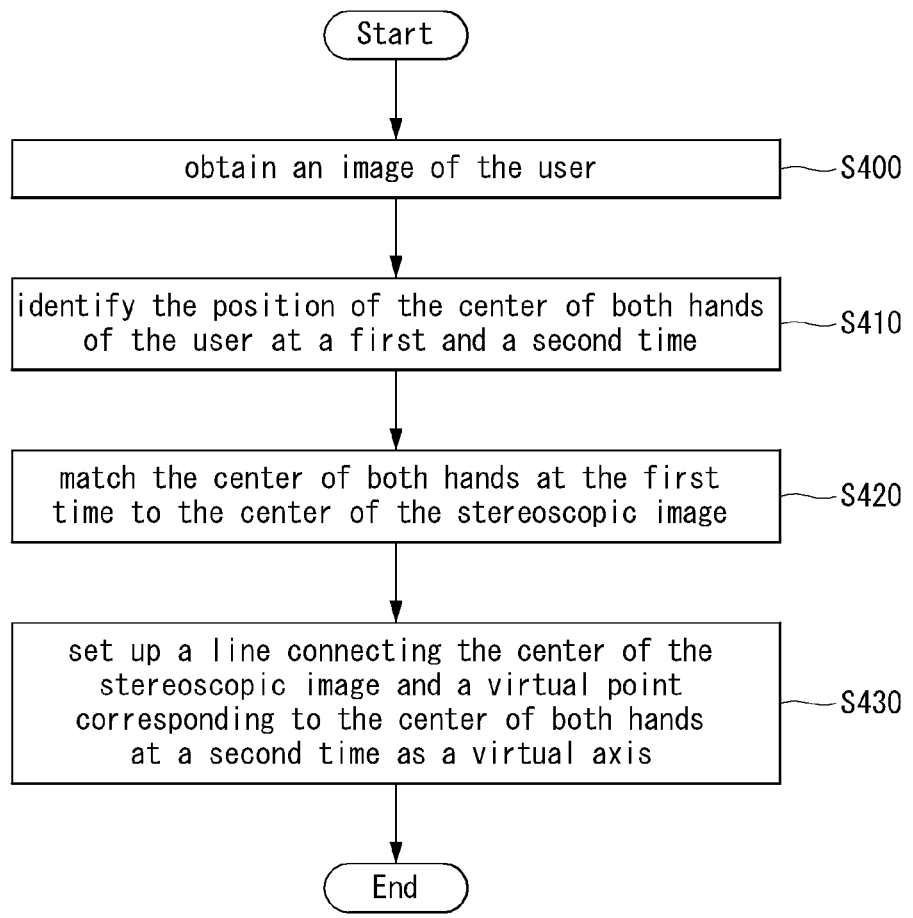
FIG. 42 is a flow diagram illustrating one example of setting up a virtual axis of an electronic device according to the present invention.

In the above, with reference to FIG. 42, a method for the controller 180 setting a virtual line as a virtual axis, the virtual line connecting a virtual point corresponding to the middle point between both hands of the user at the first time and a virtual point corresponding to the middle point between both hands of the user at the second time.

However, the scope of the present invention is not limited to the above description. For example, the controller 180 can set a virtual line as a virtual axis, the virtual line connecting a first virtual point corresponding to a specific point between a first and a second body part of the user at a first time and a second virtual point corresponding to a specific point between the first and the second body part of the user at a second time. This feature can also be applied to a method for setting a virtual axis shown in FIG. 43 which will be described below.

In addition, the controller 180 can set a virtual line as the virtual axis, the virtual line connecting a first virtual point corresponding to the position of a particular body part of the user at a first time and a second virtual point corresponding to the position of the particular body part at a second time.

Figure 43:
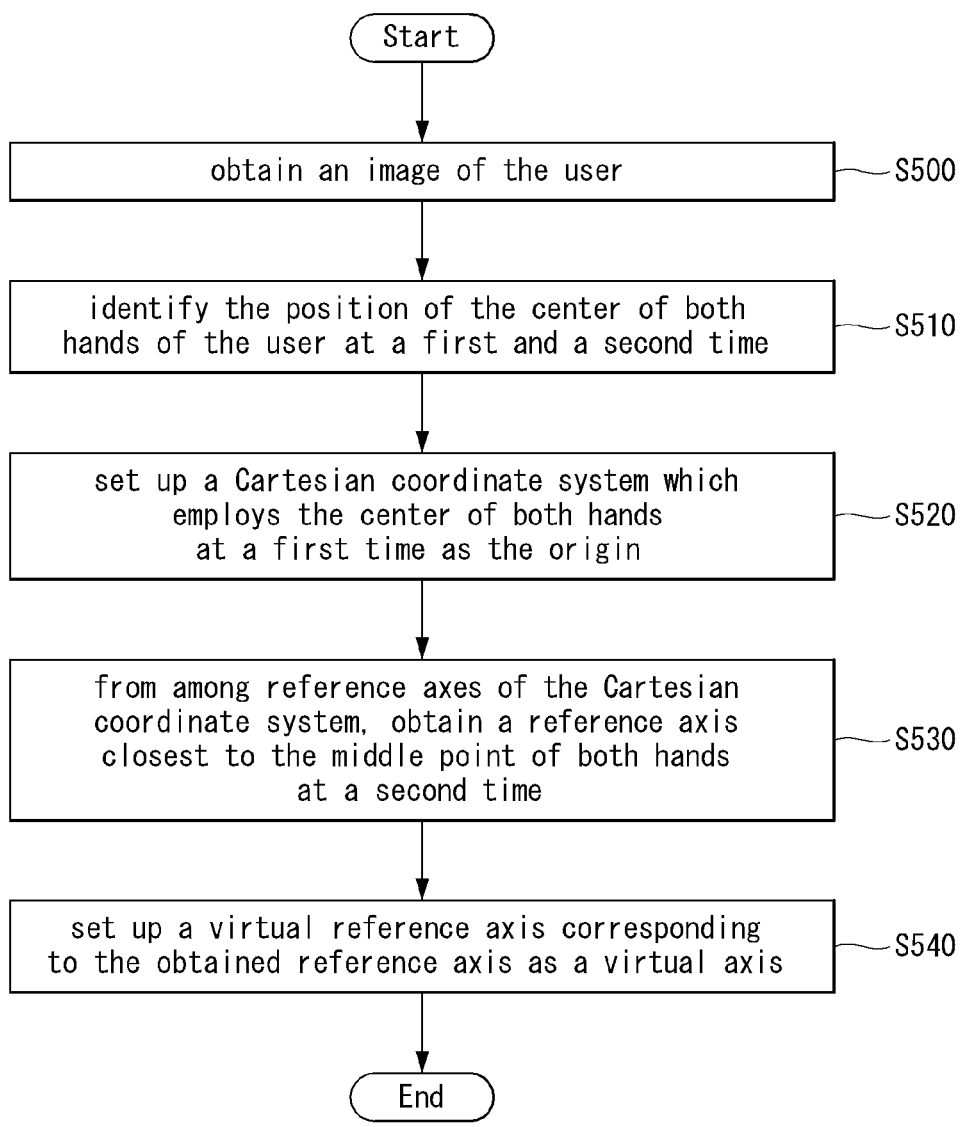
FIG. 43 is a flow diagram illustrating another example of setting up a virtual axis of an electronic device according to the present invention.

FIG. 43 is a flow diagram illustrating another example of setting up a virtual axis of an electronic device 100 according to the present invention. In what follows, a method for setting the virtual axis will be described with reference to related drawings.

If an image of the user is obtained through the camera 121, S500, the controller 180 of the electronic device 100 analyzes the obtained image and identifies positions of the middle point between both hands of the user at a first and a second time S510.

Next, the controller 180 sets up a Cartesian coordinate system which employs the middle point between the two hands at the first time as the origin S520 and among reference axes of the Cartesian coordinate system, obtains a reference axis closest to the middle point between the two hands at a second time S530. Next, the controller 180 set a virtual reference axis which corresponds to the obtained reference axis as a virtual axis S540.

In the above, with reference to FIG. 43, a method for the controller 180 setting a virtual axis based on the positions of the middle point between both hands of the user at a first and a second time has been described. However, the present invention is not limited to the method above. For example, the controller 180 can set up the virtual axis based on a first virtual point corresponding to a specific point between a first and a second body part of the user at a first time and a second virtual point corresponding to a specific point between the first and the second body part of the user at a second time.

Also, the controller 180 can set up a virtual reference axis as the virtual axis, the virtual reference axis corresponding to a reference axis closest to the position of a particular body part at a second time from among reference axes of the Cartesian coordinate system which employs the particular body part of the user at a first time as the origin.

Figure 44:
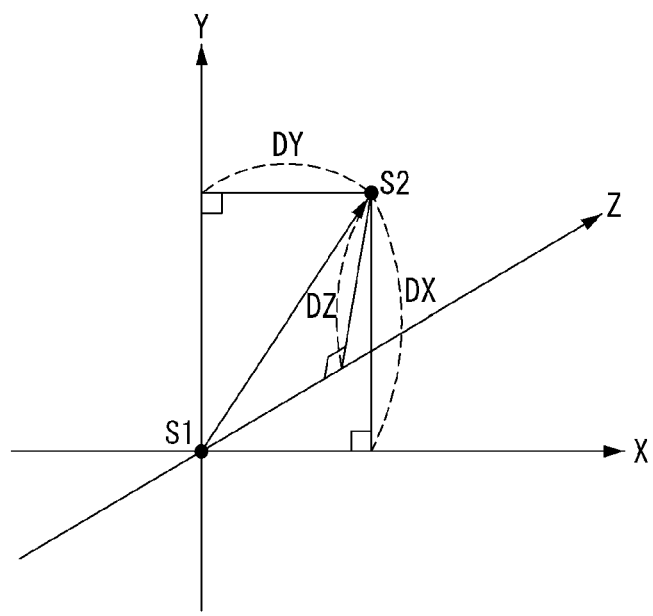
FIG. 44 illustrates a method for setting up a virtual axis shown in FIG. 43.

FIG. 44 illustrates a method for setting up a virtual axis shown in FIG. 43. It should be noted that in FIG. 44, S1 represents the position of the middle point between both hands of the user at a first time, while S2 at a second time.

The controller 180 of the electronic device 100 sets up a Cartesian coordinate system which employs the middle point between both hands at the first time as the origin and calculates distance (DX, DY, and DZ) from the position of the middle point between both hands to the reference axes of the Cartesian coordinate system.

Next, the controller 180 can obtain, among reference axes (X, Y, and Z) of the Cartesian coordinate system, a reference axis closest to the middle point between both hands at the second time and set up a virtual reference axis corresponding to the obtained reference axis as a virtual axis for scaling stereoscopic images.

Figure 45:
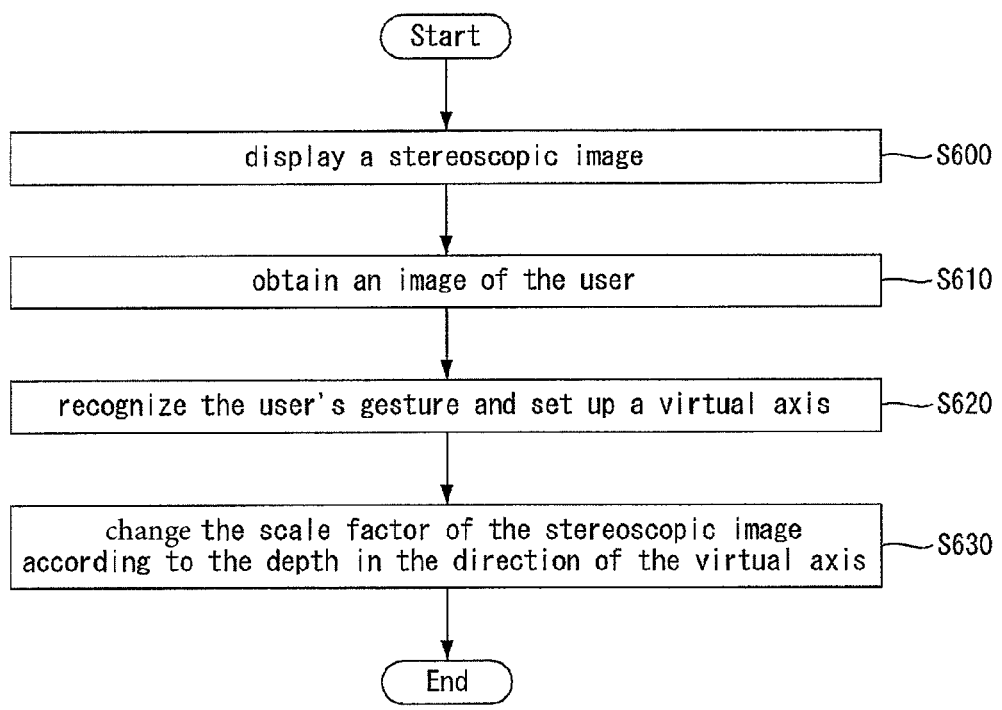
FIG. 45 is a flow diagram illustrating a method for displaying stereoscopic images of an electronic device according to yet another embodiment of the present invention.

FIG. 45 is a flow diagram illustrating a method for displaying stereoscopic images of an electronic device 100 according to yet another embodiment of the present invention. In what follows, with reference to related drawings, a method for displaying the stereoscopic images will be described.

The controller 180 of the electronic device 100 displays a stereoscopic image S600. When a stereoscopic image is displayed, the controller 180 obtains an image of the user of the electronic device through the camera 121, S610. Next, the controller 180 recognizes the user's gesture by analyzing the image of the user and sets up a virtual axis based on the direction corresponding to the recognized gesture S620. Once the virtual axis is set up, the controller 180 changes the scale factor of the stereoscopic image according to the depth in the direction of the virtual axis S630.

Figure 46:
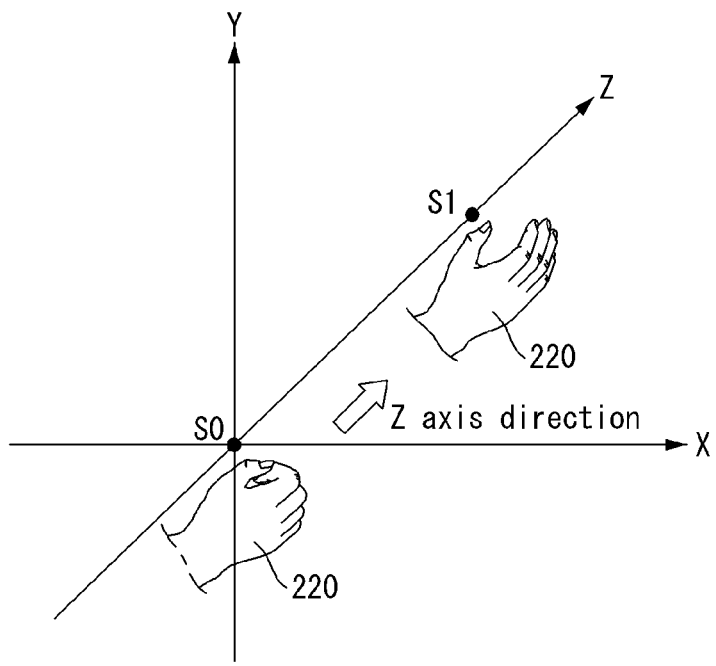
FIG. 46 is one example of the user's gesture for changing a scale factor of stereoscopic images in proportion to the depth along a virtual axis according to a method for displaying stereoscopic images of an electronic device shown in FIG. 45.

FIG. 46 is one example of the user's gesture for changing a scale factor of stereoscopic images in proportion to the depth along a virtual axis according to a method for displaying stereoscopic images of an electronic device 100 shown in FIG. 45. In FIG. 46, it is assumed that the user's right hand 220 is endowed with control and the direction corresponding to the user's gesture is recognized based on the direction of the right hand 200 and the type of the user's gesture is determined by the shape of the right hand. The assumption above is applied the same to FIG. 48 which will be described later.

With reference to FIG. 46, it can be known that the user spreads the fingers of his or her right hand 220 while moving the right hand 220 in the positive direction of Z axis with the right hand 220 being closed in the first place. The controller 180 can then set up a virtual Z' axis as a virtual axis based on the user's gesture. As shown in FIG. 46, if the user moves his or her right hand 220 in an arbitrary direction in the three-dimensional space, the controller 180 can sets up a virtual axis corresponding to the arbitrary direction.

In what follows, under the assumption that the user's gesture as indicated above increases the scale factor of the stereoscopic image in proportion to the depth in the positive direction of Z axis, an example of the electronic device 100 displaying a stereoscopic image is described.

Figure 47:
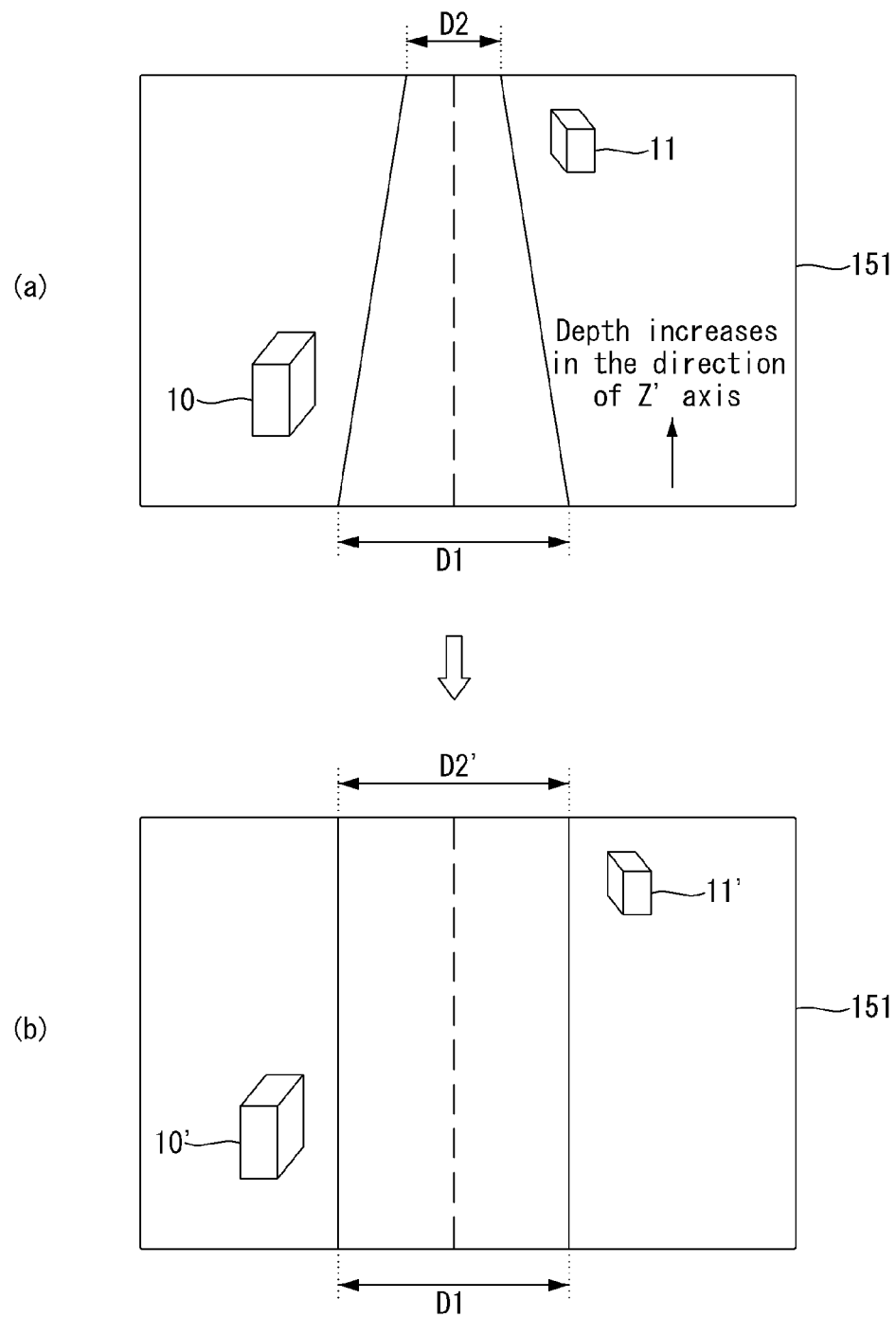
FIG. 47 is an example of an electronic device's controller displaying stereoscopic images based on the user's gesture shown in FIG. 46.

FIG. 47 is an example of an electronic device's 100 controller 180 displaying stereoscopic images based on the user's gesture shown in FIG. 46. It should be noted that the stereoscopic image shown in FIG. 47 can be a stereoscopic image obtained through a wide angle lens camera. With reference to FIG. 47, if the user makes a gesture shown in FIG. 46 after a stereoscopic image is displayed on the display 151, the controller 180 of the electronic device 100 increases the scale factor of a stereoscopic image in proportion to the depth in the direction of Z' axis.

For example, the controller 180 set up the scale factor where the stereoscopic image shows the smallest depth in the direction of Z' axis to be 1. Therefore, it can be known that the width of a road at the part where the depth along Z' axis reveals the smallest value in FIGS. 47(a) and (b) is unchanged at D1.

The controller 180, however, gradually increases the scale factor in proportion to the depth along Z' axis in the stereoscopic image. Therefore, it can be known that the width of the road at the part where the depth along Z' axis reveals the largest value in FIGS. 47(a) and (b) has been increased from D2 to D2'. Also, it can be known that among the buildings 10, 11 displayed in the stereoscopic image, the size 11 of the building which has a larger depth along Z' axis has been enlarged to the degree noticeable to the eye.

Figure 48:
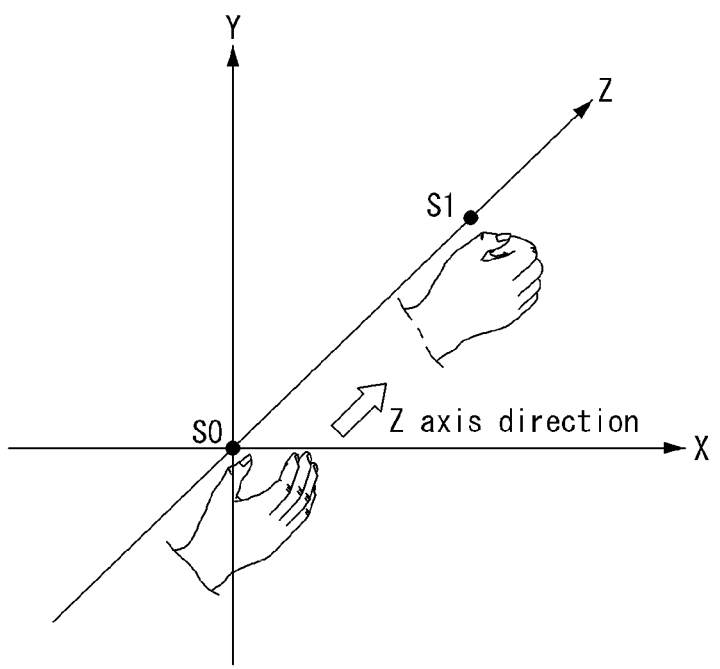
FIG. 48 is another example of the user's gesture for changing a scale factor of stereoscopic images in proportion to the depth along a virtual axis according to a method for displaying stereoscopic images of an electronic device shown in FIG. 45.

FIG. 48 is another example of the user's gesture for changing a scale factor of stereoscopic images in proportion to the depth along a virtual axis according to a method for displaying stereoscopic images of an electronic device 100 shown in FIG. 45.

With reference to FIG. 48, it can be known that the user closes his or her right hand 220 while moving the right hand 220 in the positive direction of Z axis with the user's right hand 220 spread for the first place. The controller 180 then can set up a virtual Z' axis as a virtual axis based on the user's gesture. Different from as shown in FIG. 48, if the user moves his or her right hand 220 in an arbitrary direction in the three-dimensional space, the controller 180 can set up a virtual axis corresponding to the arbitrary axis.

In what follows, under the assumption that the user's gesture as indicated above decreases the scale factor of the stereoscopic image in proportion to the depth in the positive direction of Z' axis, an example of the electronic device's 100 displaying an stereoscopic image will be described.

Figure 49:
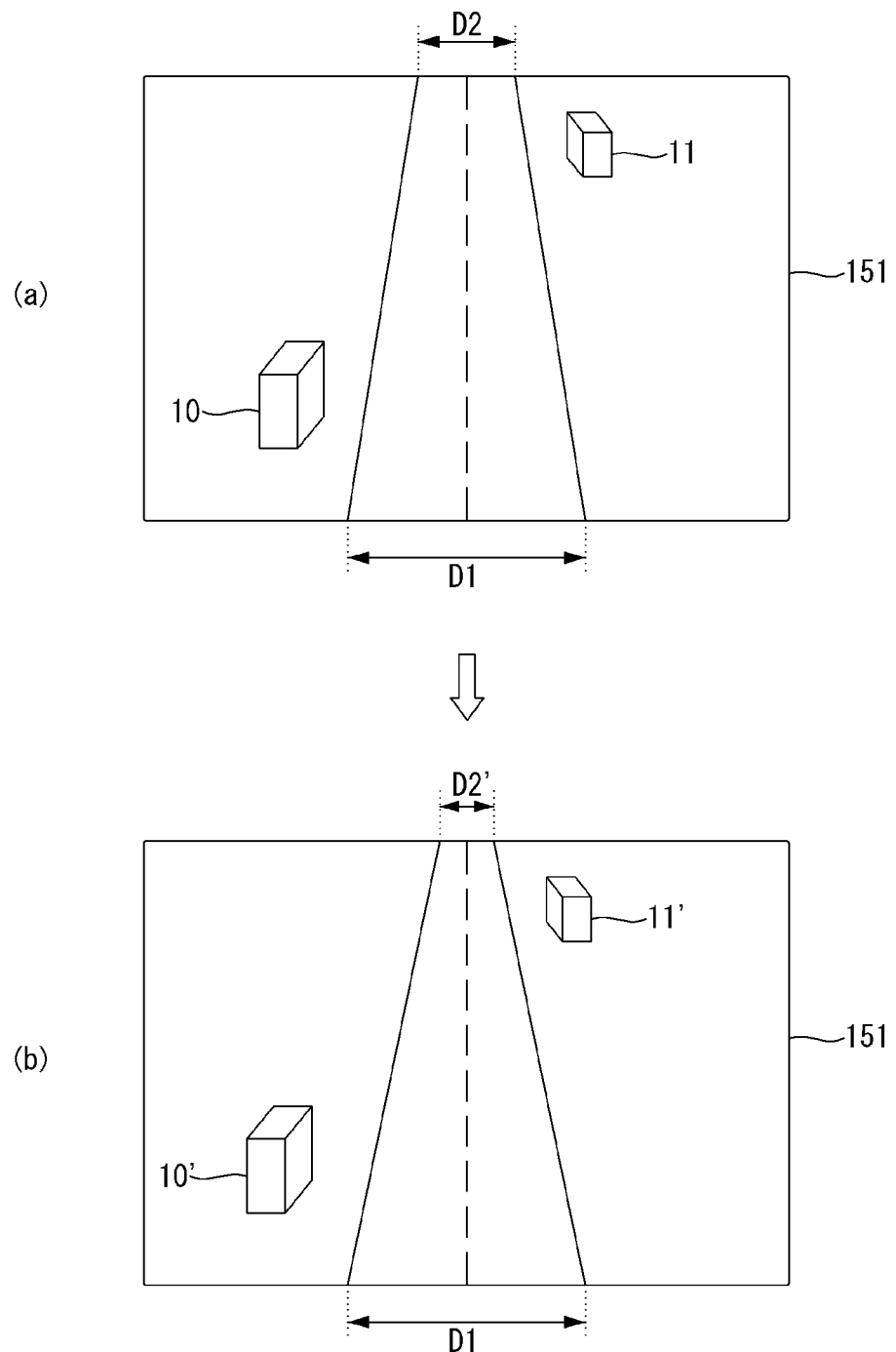
FIG. 49 is an example of an electronic device's controller displaying stereoscopic images based on the user's gesture shown in FIG. 48.

FIG. 49 is an example of an electronic device's 100 controller 180 displaying stereoscopic images based on the user's gesture shown in FIG. 48. With reference to FIG. 49, if the user makes a gesture shown in FIG. 48 after a stereoscopic image is displayed on the display 151, the controller 180 of the electronic device 100 decreases the scale factor of a stereoscopic image in proportion to the depth along Z' axis.

For example, the controller 180 sets the scale factor at the part where the depth along Z' axis of the stereoscopic image shows the smallest value to be 1 and gradually increases the scale factor of the stereoscopic image in proportion to the depth along Z' axis. Therefore, it can be known that the width of a road at the part where the depth reveals the largest depth in FIGS. 49(a) and (b) has been narrowed from D2 to D2'. Also, it can be known that from among the buildings 10, 11 displayed on the stereoscopic image, the size of the building 11 which reveals a larger depth along Z' axis has been reduced further.

Figure 50:
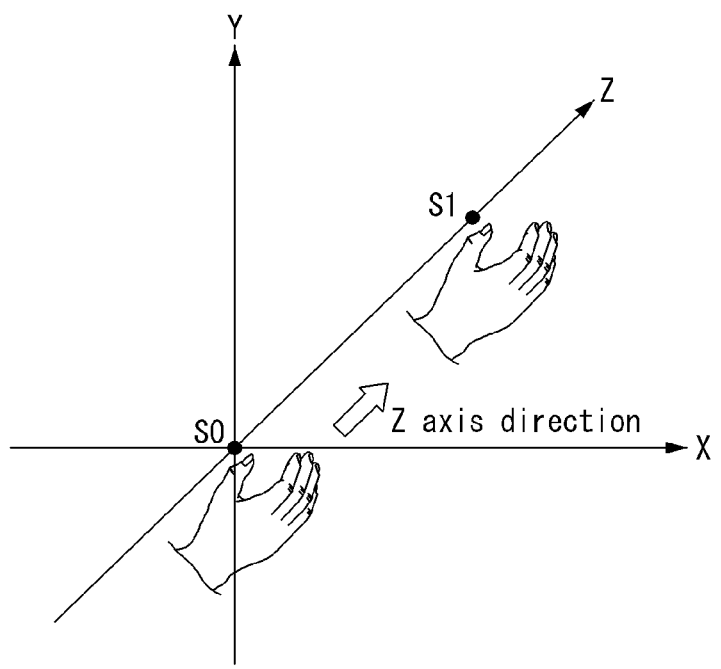
FIG. 50 is yet another example of the user's gesture for changing a scale factor of stereoscopic images in proportion to the depth along a virtual axis according to a method for displaying stereoscopic images of an electronic device shown in FIG. 45.

FIG. 50 is yet another example of the user's gesture for changing a scale factor of stereoscopic images in proportion to the depth along a virtual axis according to a method for displaying stereoscopic images of an electronic device 100 shown in FIG. 45.

With reference to FIG. 50, it can be known that the user moves his or her right hand 220 in the positive direction of Z axis with the fingers of the user's right hand 220 spread. The controller 180 then can set up a virtual Z' axis as a virtual axis based on the user's gesture. Different from as shown in FIG. 50, if the user moves his or her right hand 220 in an arbitrary direction in the three-dimensional space, the controller 180 can set up a virtual axis corresponding to the arbitrary axis.

In what follows, under the assumption that the user's gesture first increases the scale factor for the part which shows small depth in the positive direction of Z axis and reduces the scale factor of the stereoscopic image in proportion to the depth in the positive direction of Z' axis, an example of the electronic device's 100 displaying a stereoscopic image will be described.

Figure 51:
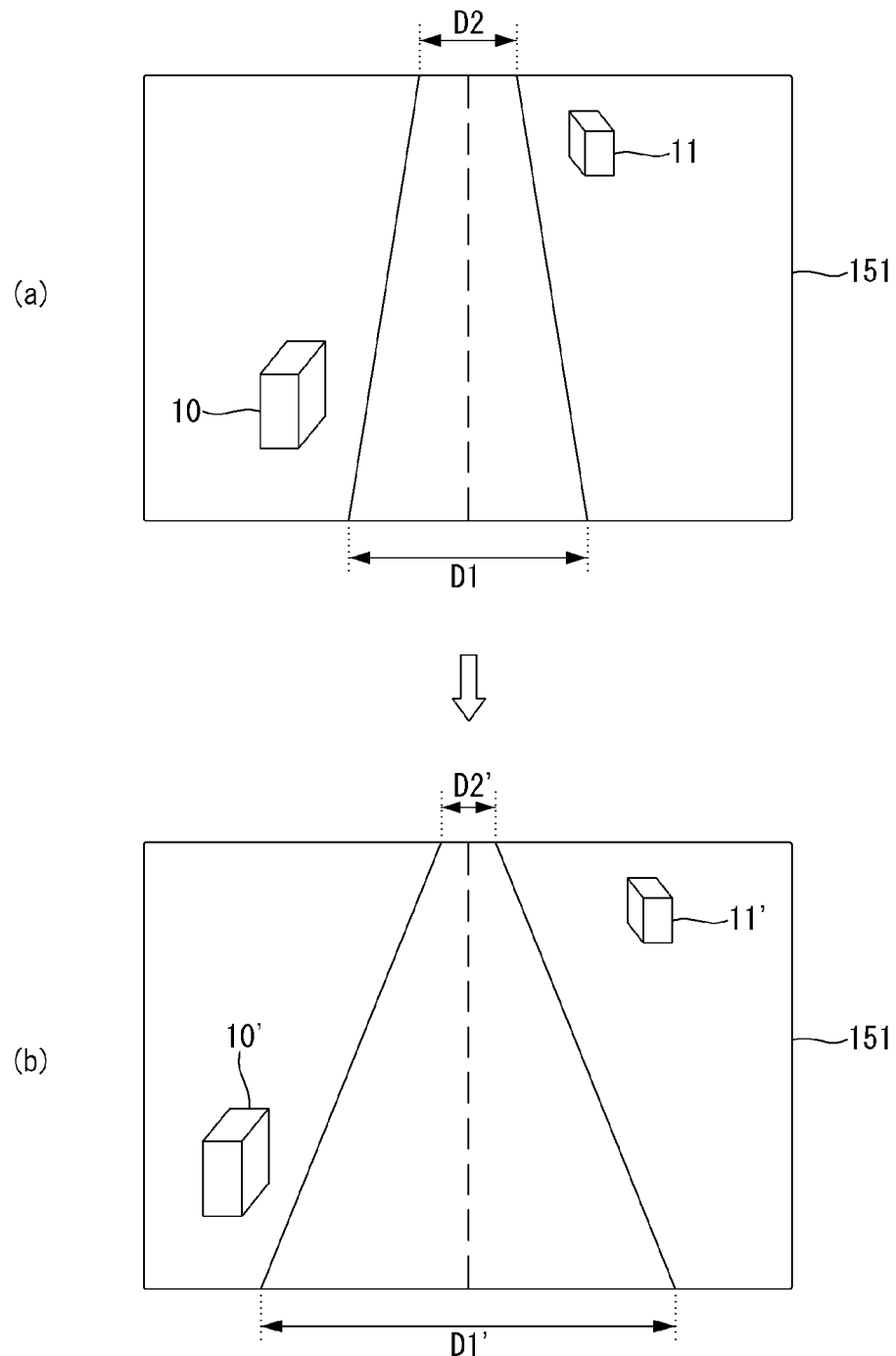
FIG. 51 is an example of an electronic device's controller displaying stereoscopic images based on the user's gesture shown in FIG. 50.

FIG. 51 is an example of an electronic device's 100 controller 180 displaying stereoscopic images based on the user's gesture shown in FIG. 50. With reference to FIG. 51, if the user makes a gesture shown in FIG. 48 after a stereoscopic image is displayed on the display 151, the controller 180 of the electronic device 100 reduces the scale factor of a stereoscopic image in proportion to the depth along Z' axis.

For example, the controller 180 increases the scale factor at the plane where the depth along Z' axis in the stereoscopic image shows the smallest depth to be larger than 1. Therefore, it can be known that the width of a road corresponding to plane with the smallest depth along Z' axis has been wider from D1 to D1' and the size of a building adjacent to the plane has also been increased.

Also, the controller 180 gradually increases the scale factor of the stereoscopic image in proportion to the depth in the positive direction of Z' axis. Accordingly, the width of the road at the part which shows the deepest depth along Z' axis in FIGS. 51(a) and (b) has been narrowed further from D2 to D2'. Also, among the buildings 10, 11 displayed on the stereoscopic image, the size of the building 11 which reveals a larger depth has been reduced further.

Each of the methods for an electronic device's displaying stereoscopic images according to the present invention described above can be recorded in a computer readable recording medium in the form of a program which can be executed through various computing means. The computer readable medium can comprise program commands, a data file, and data structure individually or in a combination thereof. Programs recorded in the medium can correspond to those designed or composed especially for the present invention or those already available to those skilled in the art of computer software.

Examples of a computer readable recording medium comprise a hard disk; a floppy disk; a magnetic medium such as a magnetic tape; optical media such as CD-ROM and DVD; a magneto-optical medium such as a floptical disk; and hardware apparatus such as ROM, RAM, and flash memory specially designed to store and carry out program commands. Examples of a program comprise high-level language codes that can be executed through an interpreter as well as assembly codes generated by a compiler. The hardware apparatus can be designed to operate as one or more software modules to carry out the operations of the present invention and vice versa.

Although the present invention has been described with a limited set of embodiments and drawings, the present invention is not limited to the embodiments and it should be understood by those skilled in the art that various modifications and changes are possible from the description in this document.

Therefore, the scope of the present invention should not be limited by the embodiments described in this document but should be defined by the appended claims and equivalents thereof.

What is claimed is:
1. An electronic device, comprising:
a display;
a camera arranged on an upper end of the display and configured to obtain an image of a user; and
a controller configured to:
display a stereoscopic image to the display,
scale the displayed stereoscopic image while moving the stereoscopic image along a single virtual axis according to a gesture recognized from the image obtained by the camera, and change a scale factor of the scaled stereoscopic image in proportion to a depth in a direction of the single virtual axis, wherein the direction of the single virtual axis is the same as a direction of the gesture recognized from the image obtained by the camera when the gesture is performed by a single body part of the user, the single body part being separated from the display, wherein the direction of the single virtual axis is perpendicular to the direction of the gesture recognized from the image obtained by the camera when the gesture is performed by two body parts of the user, the two body parts being separated from the display, and wherein the controller sets up a single virtual line as the single virtual axis, the single virtual line connecting a first virtual point corresponding to a first specific point between first and second body parts of the user at a first time and a second virtual point corresponding to a second specific point between the first and second body parts of the user at a second time.

2. The electronic device of claim 1, wherein the single virtual axis passes through a center of the stereoscopic image and a center of the scaled stereoscopic image.

3. The electronic device of claim 1, wherein the stereoscopic image is inscribed in the scaled stereoscopic image or circumscribed to the scaled stereoscopic image through at least one point.

4. The electronic device of claim 1, wherein the controller moves the stereoscopic image along the single virtual axis based on a direction of movement corresponding to the recognized gesture.

5. The electronic device of claim 1, wherein the controller changes the scale factor of the scaled stereoscopic image in proportion to the depth along the single virtual axis based on a type of the recognized gesture.

6. The electronic device of claim 1, wherein the controller magnifies or reduces the stereoscopic image based on a type of the recognized gesture.

7. The electronic device of claim 1, wherein the controller controls a magnification or reduction ratio for the stereoscopic image based on a movement distance of a body part of the user which forms the recognized gesture.

8. The electronic device of claim 1, wherein the controller matches the first specific point between the first and second body parts at the first time to a center of the stereoscopic image.

9. The electronic device of claim 1, wherein the first and second specific points between the first and the second body parts at the first and second times are middle points between the first and second body parts at the respective times.

10. The electronic device of claim 1, wherein the controller magnifies the stereoscopic image between the first and second times as a distance between the first and second body parts increases, and reduces the stereoscopic image between the first and second times as the distance between the first and second body parts decreases.

11. The electronic device of claim 1, wherein the controller sets up a single virtual reference axis as the single virtual axis, the single virtual reference axis corresponding to a reference axis, from among reference axes of a Cartesian coordinate system, and which employs the first specific point between the first and second body parts at the first time as an origin, and a closest specific point between the first and second body parts at the second time as another point of the single virtual reference axis.

12. The electronic device of claim 11, wherein the controller matches the first specific point between the first and second body parts at the first time to a center of the stereoscopic image.

13. The electronic device of claim 1, wherein the controller sets up the single virtual line as the single virtual axis, the single virtual line connecting the first virtual point corresponding to a position of a particular body part of the user at the first time and the second virtual point corresponding to a position of the particular body part at the second time.

14. The electronic device of claim 1, wherein the controller sets up a single virtual reference axis as the single virtual axis, the single virtual reference axis corresponding to a single reference axis, from among reference axes of a Cartesian coordinate system, and which employs a position of a particular body part of the user at the first time as an origin, and a closest position of the particular body part at the second time as another point of the single virtual reference axis.

15. The electronic device of claim 1, wherein the single virtual axis extends from the user to the display.

16. The electronic device of claim 1, wherein a distance between at least one point of the stereoscopic image and the user is constant along the single virtual axis.

17. An electronic device, comprising:
a display;
a camera arranged on an upper end of the display and configured to obtain an image of a user; and
a controller configured to:
display a stereoscopic image to the display, recognize a gesture of the user front the image obtained by the camera, set up a single virtual axis and scale the displayed stereoscopic image based on the recognized gesture, and based on the recognized gesture, change a scale factor of the scaled stereoscopic image in proportion to a depth in a direction of the single virtual axis, wherein the direction of the single virtual axis is the same as a direction of the gesture recognized from the image obtained by the camera when the gesture is performed by a single body part of the user, the single body part being separated from the display, wherein the direction of the single virtual axis is perpendicular to the direction of the gesture recognized from the image obtained by the camera when the gesture is performed by two body parts of the user, the two body parts being separated from the display, and wherein the controller sets up a single virtual line as the single virtual axis, the single virtual line connecting a first virtual point corresponding to a specific point between first and second body parts of the user at a first time and a second virtual point corresponding to a specific point between the first and second body parts of the user at a second time.

18. The electronic device of claim 17, wherein the controller sets up the single virtual axis based on a direction of movement corresponding to the recognized gesture.

19. The electronic device of claim 17, wherein the controller, based on a type of the recognized gesture, changes the scale factor of the scaled stereoscopic image in proportion to the depth in the direction of the single virtual axis.

20. The electronic device of claim 17, wherein the controller magnifies or reduces the stereoscopic image based on a type of the recognized gesture.

21. The electronic device of claim 17, wherein the controller controls a magnification or reduction ratio for the stereoscopic image based on a movement distance of a body part of the user which forms the recognized gesture.

22. The electronic device of claim 17, wherein the controller sets up a single virtual reference axis as the single virtual axis, the single virtual reference axis corresponding to a single reference axis, from among reference axes of a Cartesian coordinate system, and which employs the first specific point between the first and second body parts at a first time as an origin, and a closest specific point between the first and second body parts at the second time as another point of the single virtual reference axis.

23. The electronic device of claim 17, wherein the controller sets up the single virtual line as the single virtual axis, the single virtual line connecting the first virtual point corresponding to a position of a particular body part of the user at the first time and the second virtual point corresponding to a position of the particular body part at the second time.

24. The electronic device of claim 17, wherein the controller sets up a single virtual reference axis as the virtual axis, the single virtual reference axis corresponding to a single reference axis, from among reference axes of a Cartesian coordinate system, and which employs a position of a first particular body part of the user at the first time as an origin, and a closest position of the particular body part at the second time as another point of the single virtual reference axis.

25. A method for an electronic device to display a stereoscopic image, the method comprising:
  obtaining an image of a user using a camera;
  displaying a stereoscopic image using a display;
  determining a direction of a gesture recognized from the obtained image of the user;
  determining a direction of a single virtual axis based on the determined direction of the gesture recognized from the obtained image of the user; and
  scaling the stereoscopic image while moving the stereoscopic image along the single virtual axis according to the gesture recognized from the image of the user, the scaling of the stereoscopic image comprising changing a scale factor of the scaled stereoscopic image in proportion to a depth in the determined direction of the single virtual axis,
  wherein the direction of the single virtual axis is the same as a direction of the gesture recognized from the image obtained by the camera when the gesture is performed by a single body part of the user, the single body part being separated from the display,
  wherein the direction of the single virtual axis is perpendicular to the direction of the gesture recognized from the image obtained by the camera when the gesture is performed by two body parts of the user, the two body parts being separated from the display, and
  wherein the single virtual axis is set up as a single virtual line, the single virtual line connecting a first virtual point corresponding to a first specific point between first and second body parts of the user at a first time and a second virtual point corresponding to a second specific point between the first and second body parts of the user at a second time.

26. A method for an electronic device to display a stereoscopic image, the method comprising:
  displaying a stereoscopic image using a display;
  obtaining an image of a user using a camera;
  recognizing a gesture of the user from the image of the user;
  determining a direction of the gesture recognized from the obtained image of the user;
  determining a direction of a single virtual axis based on the determined direction of the gesture recognized from the obtained image of the user; and
  setting up the single virtual axis based on the recognized gesture and scaling the stereoscopic image, the scaling of the stereoscopic image comprising, based on the recognized gesture, changing a scale factor of the scaled stereoscopic image in proportion to a depth in the determined direction of the single virtual axis,
  wherein the direction of the single virtual axis is the same as a direction of the gesture recognized from the image obtained by the camera when the gesture is performed by a single body part of the user, the single body part being separated from the display,
  wherein the direction of the single virtual axis is perpendicular to the direction of the gesture recognized from the image obtained by the camera when the gesture is performed by two body parts of the user, the two body parts being separated from the display, and
  wherein the single virtual axis is set up as a single virtual line, the single virtual line connecting a first virtual point corresponding to a first specific point between first and second body parts of the user at a first time and a second virtual point corresponding to a second specific point between the first and second body parts of the user at a second time.

* * * * *